United States Patent
Jeong et al.

(10) Patent No.: US 9,767,745 B2
(45) Date of Patent: Sep. 19, 2017

(54) OPTICAL MODULATION DEVICE, OPTICAL DEVICE INCLUDING THE SAME, AND DRIVING METHOD THEREOF

(71) Applicant: SAMSUNG DISPLAY CO., LTD., Yongin, Gyeonggi-Do (KR)

(72) Inventors: Seung Jun Jeong, Hwaseong-si (KR); Yoon Kyung Park, Seoul (KR); Hyun Seung Seo, Anyang-si (KR); Soo Hee Oh, Hwaseong-si (KR); Seong Min Cho, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 133 days.

(21) Appl. No.: 14/703,927

(22) Filed: May 5, 2015

(65) Prior Publication Data

US 2016/0156903 A1    Jun. 2, 2016

(30) Foreign Application Priority Data

Dec. 2, 2014 (KR) ........................ 10-2014-0170708

(51) Int. Cl.
*G02F 1/13* (2006.01)
*G09G 3/36* (2006.01)
(Continued)

(52) U.S. Cl.
CPC ....... *G09G 3/3614* (2013.01); *G02B 27/2214* (2013.01); *G02F 1/0136* (2013.01);
(Continued)

(58) Field of Classification Search
CPC   G09G 3/3614; G02B 27/2214; G02F 1/0136; H04N 13/0404
(Continued)

(56) References Cited

U.S. PATENT DOCUMENTS 7,872,694 B2   1/2011 Im
8,305,550 B2   11/2012 Jung et al.
(Continued)

FOREIGN PATENT DOCUMENTS

| JP | 3358150 | 10/2002 |
| JP | 2003-091013 | 3/2003 |
| JP | 2010-078653 | 4/2010 |

OTHER PUBLICATIONS

Paul F. McManamon, et. al., A Review of Phased Array Steering for Narrow-Band Electrooptical Systems, Proceedings of the IEEE, vol. 97, No. 6, Jun. 2009, pp. 1078-1096.
(Continued)

*Primary Examiner* — James Dudek
(74) *Attorney, Agent, or Firm* — F. Chau & Associates, LLC

(57) ABSTRACT

A method for driving an optical modulation device is provided. The optical modulation device includes first and second portions. Each of the first and second portions includes a first plate, a second plate opposite to the first plate, and a liquid crystal layer disposed between the first and second plates. The method includes forming a forward phase gradient in the first portion by applying a first driving signal to first and second electrodes in the first plate of the first portion and a third electrode in the second plate of the first portion. The method further includes forming a reverse phase gradient in the second portion by applying a second driving signal differing from the first driving signal to fourth and fifth electrodes in the first plate of the second portion and a sixth electrode in the second plate of the second portion.

14 Claims, 24 Drawing Sheets

(51) Int. Cl.
*G02F 1/01* (2006.01)
*G02B 27/22* (2006.01)
*H04N 13/04* (2006.01)
*G02F 1/1337* (2006.01)
*G02F 1/1343* (2006.01)

(52) U.S. Cl.
CPC .................... *H04N 13/0404* (2013.01); *G02F 2001/133742* (2013.01); *G02F 2001/134381* (2013.01); *G09G 2300/0495* (2013.01); *H04N 13/0409* (2013.01)

(58) Field of Classification Search
USPC .......................................................... 349/15
See application file for complete search history.

(56) References Cited

U.S. PATENT DOCUMENTS

| | | |
|---|---|---|
| 8,305,551 B2 | 11/2012 | Son |
| 8,531,646 B2 | 9/2013 | Shi et al. |
| 2012/0162550 A1* | 6/2012 | Jeong ................ H04N 13/0404 349/15 |

OTHER PUBLICATIONS

Lei Shi, et al., "Liquid Crystal Optical Phase Plate With a Variable In-Plane Gradient", Journal of Applied Physics, 104, 033109 (2008).

* cited by examiner

OPTICAL MODULATION DEVICE, OPTICAL DEVICE INCLUDING THE SAME, AND DRIVING METHOD THEREOF

CROSS-REFERENCE TO RELATED APPLICATION

This application claims priority under 35 U.S.C. §119 to Korean Patent Application No. 10-2014-0170708, filed on Dec. 2, 2014, in the Korean Intellectual Property Office, the disclosure of which is incorporated by reference herein in its entirety.

TECHNICAL FIELD

The present invention relates to an optical modulation device, and more particularly, to an optical modulation device, an optical device including the optical modulation device, and a driving method thereof.

DISCUSSION OF THE RELATED ART

Three-dimensional (3D) image display devices may employ an optical modulation device for generating images (e.g., a left-eye image and a right-eye image) corresponding to different viewpoints and transmitting the same so that a viewer may recognize the same as stereoscopic images. The optical modulation device may include a lens or a prism in which a propagating direction of light of the image is changed and the image is transmitted with a desired viewpoint. The propagating direction of light may be controlled using diffraction of the light due to phase modulation of light in the optical modulation device.

SUMMARY

According to an exemplary embodiment of the present invention, a method for driving an optical modulation device is provided. The optical modulation device includes a first portion and a second portion. Each of the first and second portions includes a first plate, a second plate opposite to the first plate, and a liquid crystal layer disposed between the first and second plates. The method includes forming a forward phase gradient in the first portion by applying a first driving signal to first and second electrodes in the first plate of the first portion and a third electrode in the second plate of the first portion. The method further includes forming a reverse phase gradient in the second portion by applying a second driving signal differing from the first driving signal to fourth and fifth electrodes in the first plate of the second portion and a sixth electrode in the second plate of the second portion. The first plate includes a first aligner. The second plate includes a second aligner. An alignment direction of the first aligner and an alignment direction of the second aligner are substantially parallel to each other.

When no electric field is formed in the liquid crystal layer, an alignment direction of liquid crystal molecules of the liquid crystal layer near the first plate may be opposite to an alignment direction of liquid crystal molecules of the liquid crystal layer near the second plate.

When the first driving signal is applied to the first to third electrodes, an absolute value of a first voltage applied to the first electrode may be less than an absolute value of a second voltage applied to the second electrode. The first and second electrodes may neighbor each other.

When the first driving signal is applied to the first to third electrodes, polarities of the first voltage and the second voltage with respect to a third voltage applied to the third electrode may be the same as each other.

When the first driving signal is applied to the first to third electrodes, an intensity of an electric field in a region of the liquid crystal layer near the first electrode may be less than an intensity of an electric field in a region of the liquid crystal layer near the third electrode corresponding to the first electrode.

When the first driving signal is applied to the first to third electrodes, an intensity of an electric field in a region of the liquid crystal layer near the second electrode may be greater than an intensity of an electric field in a region of the liquid crystal layer near the third electrode corresponding to the second electrode.

The forming of the reverse phase gradient in the second portion by applying the second driving signal may include applying a first signal of the second driving signal to the fourth to sixth electrodes, applying a second signal of the second driving signal to the fourth to sixth electrodes after a first time elapses since the first signal is applied, and applying a third signal of the second driving signal to the fourth to sixth electrodes after a second time elapses since the second signal is applied.

When the first signal the second driving signal is applied to the fourth to sixth electrodes, an absolute value of a fourth voltage applied to the fourth electrode may be less than a fifth voltage applied to the fifth electrode. The fourth and fifth electrodes may neighbor each other.

When the first signal of the second driving signal is applied to the fourth to sixth electrodes, polarities of the fourth voltage and the fifth voltage with respect to a sixth voltage applied to the sixth electrode may be the same as each other.

When the second signal of the second driving signal is applied to the fourth to sixth electrodes, a polarity of a seventh voltage applied to the fourth electrode may be opposite to a polarity of an eighth voltage applied to the fifth electrode.

The polarity of the eighth voltage may be the same as the polarity of the fifth voltage.

The third signal of the second driving signal is applied to the fourth to sixth electrodes, and an absolute value of a ninth voltage applied to the fourth electrode may be greater than an absolute value of a tenth voltage applied to the fifth electrode.

When the third signal of the second driving signal is applied to the fourth to sixth electrodes, polarities of the ninth voltage and the tenth voltage with respect to an eleventh voltage applied to the sixth electrode may be the same as each other.

The polarity of the eighth voltage may be the same as the polarity of the tenth voltage.

According to an exemplary embodiment of the present invention, an optical modulation device is provided. The optical modulation device includes a first plate, a second plate, and a liquid crystal layer. The second plate is opposite to the first plate. The liquid crystal layer is disposed between the first plate and the second plate. The first plate includes first to fourth electrodes and a first aligner, the second plate includes fifth and sixth electrodes and a second aligner. An alignment direction of the first aligner is substantially parallel to an alignment direction of the second aligner. A forward phase gradient is formed in a first portion of the optical modulation device by applying a first driving signal to the first, second, and fifth electrodes in the first portion. A reverse phase gradient is formed in a second portion of the optical modulation device by applying a second driving signal different from the first driving signal to the third, fourth, and sixth electrodes in the second portion.

When no electric field is formed in the liquid crystal layer, an alignment direction of liquid crystal molecules of the liquid crystal layer near the first plate may be opposite to an alignment direction of liquid crystal molecules of the liquid crystal layer near the second plate.

When the first driving signal is applied to the first, second, and fifth electrodes in the first portion, an absolute value of a first voltage applied to the first electrode may be less than an absolute value of a second voltage applied to the second electrode. The first and second electrodes may neighbor each other.

The second driving signal applied to the third, fourth, and sixth electrodes in the second portion may include a first signal, a second signal, and a third signal. The second signal may be applied after a first time elapses since the first signal is applied. The third signal may be applied after a second time elapses since the second signal is applied.

According to an exemplary embodiment of the present invention, a display device is provided. The display device includes a display panel and an optical modulation device. The display panel displays an image. The optical modulation device forms a lens having a forward phase gradient or a reverse phase gradient that refracts the image displayed by the display panel. The optical modulation device includes a first plate, a second plate opposite to the first plate, and a liquid crystal layer disposed between the first plate and the second plate. The first plate includes first and second electrodes in a first portion of the optical modulation device, and includes third and fourth electrodes in a second portion of the optical modulation device. The second plate includes a fifth electrode in the first portion and a sixth electrode in the second portion. The forward phase gradient is formed in the first portion by applying a first driving signal to the first, second, and fifth electrodes. The reverse phase gradient is formed in the second portion by applying a second driving signal different from the first driving signal to the third, fourth, and sixth electrodes.

The first plate may include a first aligner. The second plate may include a second aligner. An alignment direction of the first aligner may be substantially parallel to an alignment direction of the second aligner.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
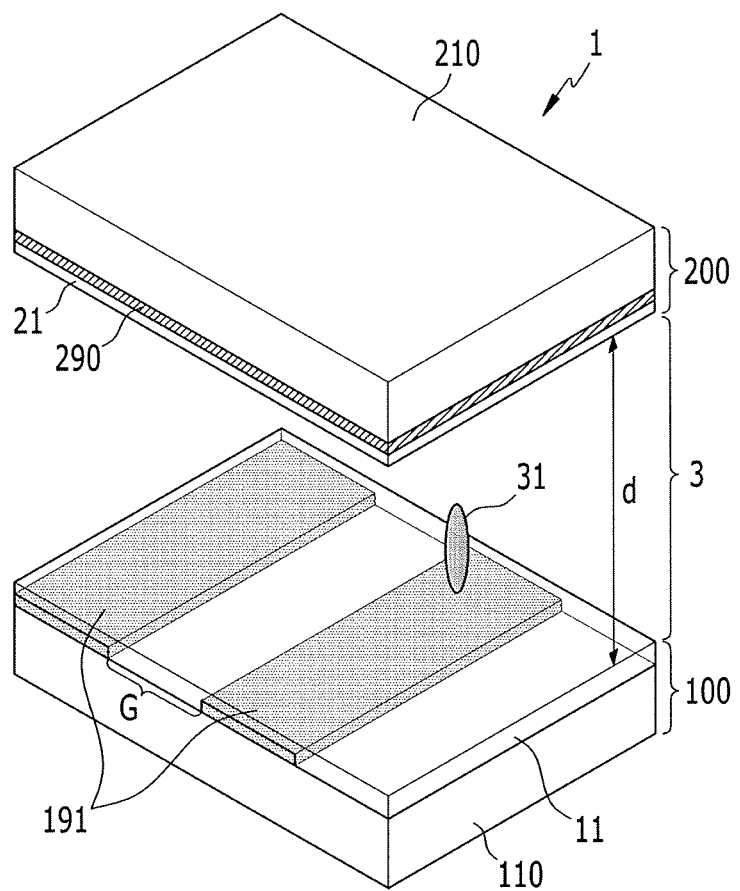
FIG. 1 shows a perspective view of an optical modulation device according to an exemplary embodiment of the present invention.

Exemplary embodiment of the present invention will be described more fully hereinafter with reference to the accompanying drawings, in which exemplary embodiments thereof are shown. The present invention may be modified in various forms without departing from the spirit or scope of the present invention and should not be construed as being limited to the exemplary embodiments set forth herein.

In the drawings, thickness of layers, films, panels, regions, etc., may be exaggerated for clarity. Like reference numerals may designate like elements throughout the specification.

An optical modulation device according to an exemplary embodiment of the present invention will now be described with reference to FIG. 1 to FIG. 3.

Figure 2:
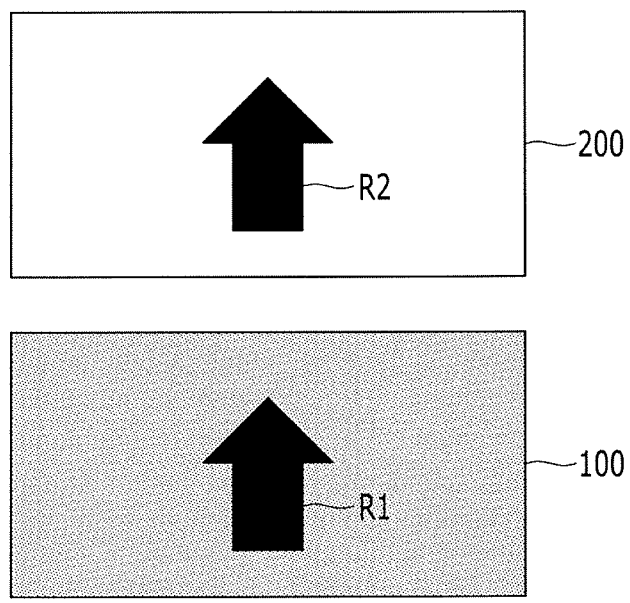
FIG. 2 shows a top plan view of an alignment direction on a first plate and a second plate included in an optical modulation device according to an exemplary embodiment of the present invention.
Figure 3:
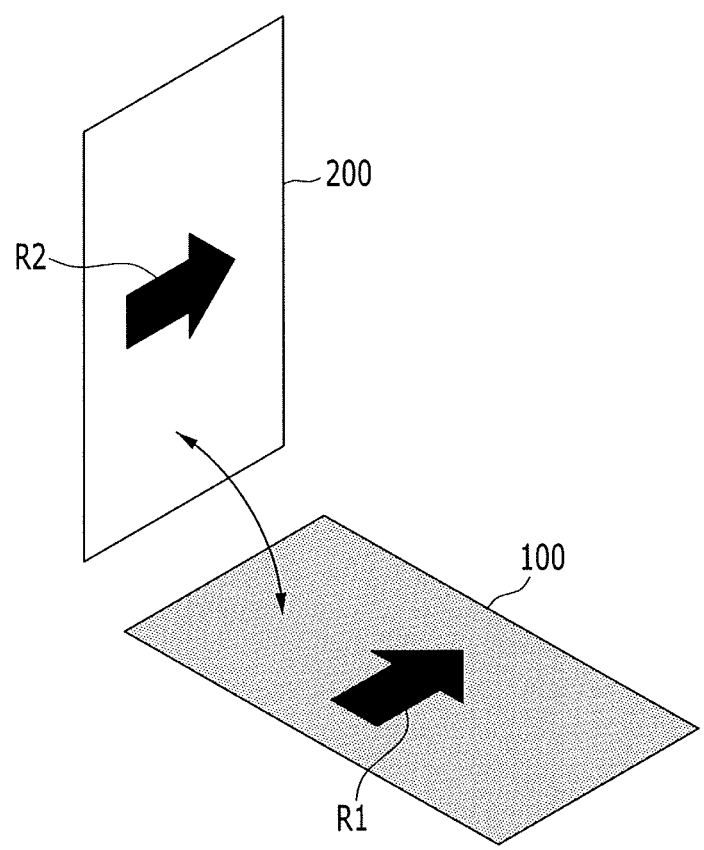
FIG. 3 shows a process for bonding the first plate and the second plate of FIG. 2 according to an exemplary embodiment of the present invention.

FIG. 1 shows a perspective view of an optical modulation device according to an exemplary embodiment of the present invention, FIG. 2 shows a top plan view of an alignment direction on a first plate and a second plate included in an optical modulation device according to an exemplary embodiment of the present invention, and FIG. 3 shows a process for bonding a first plate and a second plate shown in FIG. 2.

Referring to FIG. 1, the optical modulation device 1 according to an exemplary embodiment of the present invention includes a first plate 100 and a second plate 200 opposite to each other, and a liquid crystal layer 3 provided therebetween.

The first plate 100 may include a first substrate 110 made of glass, plastic, or the like. The first substrate 110 may be rigid, flexible, flat, or at least part thereof may be bendable.

A plurality of lower-plate electrodes 191 are provided on the first substrate 110. The lower-plate electrodes 191 may include a conductive material. For example, the lower-plate electrodes 191 may include a transparent conductive material such as ITO, IZO, or the like, or a metal. The lower-plate electrodes 191 may receive a voltage from a voltage supply unit, and among the lower-plate electrodes 191, some lower-plate electrodes 191, which are adjacent to each other, may receive different voltages.

The lower-plate electrodes 191 may be arranged in a predetermined direction, for example, an x-axis direction, and the respective lower-plate electrodes 191 may be extended in a perpendicular direction, for example, a y-axis direction to the arranged direction.

A width of a space G between neighboring lower-plate electrodes 191 may be adjustable in various ways depending on design conditions of the optical modulation device. A ratio of a width of the lower-plate electrode 191 and the width of the space G may be substantially N:1 (N is a real number that is greater than 1).

The second plate 200 may include a second substrate 210 made of glass, plastic, or the like. The second substrate 210 may be rigid or flexible, and may be flat or at least partially bendable.

An upper-plate electrode 290 is provided on the second substrate 210. The upper-plate electrode 290 may include a conductive material. For example, the upper-plate electrode 290 may include a transparent conductive material such as ITO, IZO, or the like, or a metal. The upper-plate electrode 290 may receive a voltage from the voltage supply unit. The upper-plate electrode 290 may be formed to be a whole body on the second substrate 210, or may be patterned to include a plurality of separated portions.

The liquid crystal layer 3 includes a plurality of liquid crystal molecules 31. The liquid crystal molecules 31 may have negative dielectric anisotropy. The liquid crystal molecules 31 may be arranged in a transverse direction with respect to a direction of an electric field generated in the liquid crystal layer 3. The liquid crystal molecules 31 may be substantially perpendicularly aligned with respect to the second plate 200 and the first plate 100 and may form a pre-tilt in a specific direction when no electric field is generated in the liquid crystal layer 3. The liquid crystal molecules 31 may be nematic liquid crystal molecules.

A height d of a cell gap of the liquid crystal layer 3 may substantially satisfy Equation 1 for light with a specific wavelength (λ). Accordingly, the optical modulation device 1 according to an exemplary embodiment of the present invention may function as a half-wave plate, and may be used as a diffraction lattice, a lens, or the like.

$$\frac{\lambda}{2} \times 1.3 \geq \Delta nd \geq \frac{\lambda}{2} \qquad \text{(Equation 1)}$$

Here, Δnd is a phase delay value of the light transmitting through the liquid crystal layer 3.

A first aligner 11 is provided in the first plate 100, and a second aligner 21 is provided in the second plate 200. The first aligner 11 and the second aligner 21 may be vertical alignment layers, and may have an alignment force formed according to various methods such as a rubbing process, an optical alignment process, or the like, to determine a pre-tilt direction of the liquid crystal molecules 31 provided near the first plate 100 and the second plate 200. In the case of using the rubbing process, the vertical alignment layer (e.g., the first aligner 11 or the second aligner 21) may be an organic vertical alignment layer. In the case of using the optical alignment process, an alignment material including a photosensitive polymer material is coated on internal sides of the first plate 100 and the second plate 200, and beams such as ultraviolet rays, or the like, are irradiated thereto to form a photo-polymerization material.

Referring to FIG. 2, respective alignment directions R1 and R2 of the aligners 11 and 21 provided in the first plate 100 and second plate 200 are substantially parallel with each other. Further, the respective alignment directions R1 and R2 of the aligners 11 and 21 are constant.

The phase change of light by the optical modulation device 1 may be determined by the direction of the arranged liquid crystal molecules (e.g., an azimuthal angle).

When a misaligning margin of the first plate 100 and the second plate 200 is considered, a difference between an azimuthal angle of the first aligner 11 of the first plate 100 and an azimuthal angle of the second aligner 21 of the second plate 200 may be substantially ±5°, but is not limited thereto. Here, the azimuthal angle may be understood as an angle which is rotated from a reference point in a plan view.

Referring to FIG. 3, the optical modulation device 1 according to an exemplary embodiment of the present invention may be formed by arranging the first plate 100 and the second plate 200 and by bonding the same together. The first and second aligners 11 and 21 aligned to be substantially parallel to each other are formed, respectively, in the first and second plates 100 and 200.

Positions of the first plate 100 and the second plate 200 may be interchanged.

According to an exemplary embodiment of the present invention, the first and second aligners 11 and 21 formed, respectively, in the first plate 100 and the second plate 200 of the optical modulation device 1 including liquid crystal are parallel with each other, the respective alignment directions R1 and R2 of the first and second aligners 11 and 21 are constant, and thus, an alignment process and a manufacture process of the optical modulation device 1 may be simplified. Therefore, faults of the optical modulation device 1 induced by an alignment fault or an optical device including the same may be prevented. Thus, the optical modulation device 1 having a relatively large size may be achieved.

An operation of an optical modulation device 1 according to an exemplary embodiment of the present invention will now be described with reference to FIG. 4 to FIG. 7 together with described FIG. 1 to FIG. 3.

Figure 4:
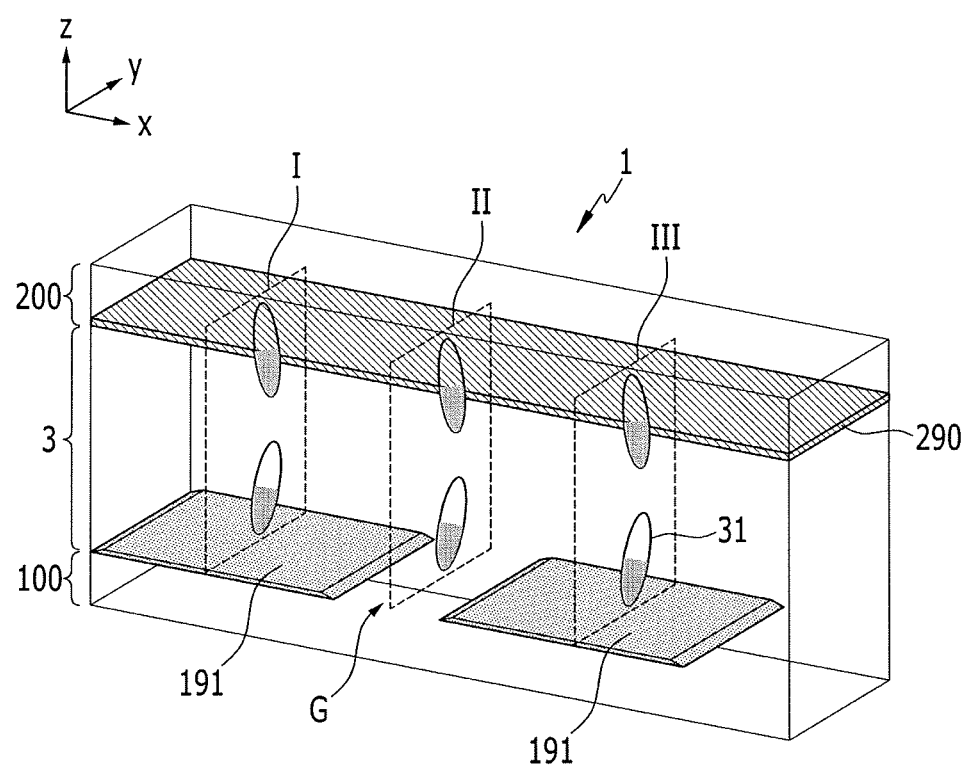
FIG. 4 shows a perspective view of an arrangement of liquid crystal molecules when no voltage difference is applied between a first plate and a second plate of an optical modulation device according to an exemplary embodiment of the present invention.
Figure 5:
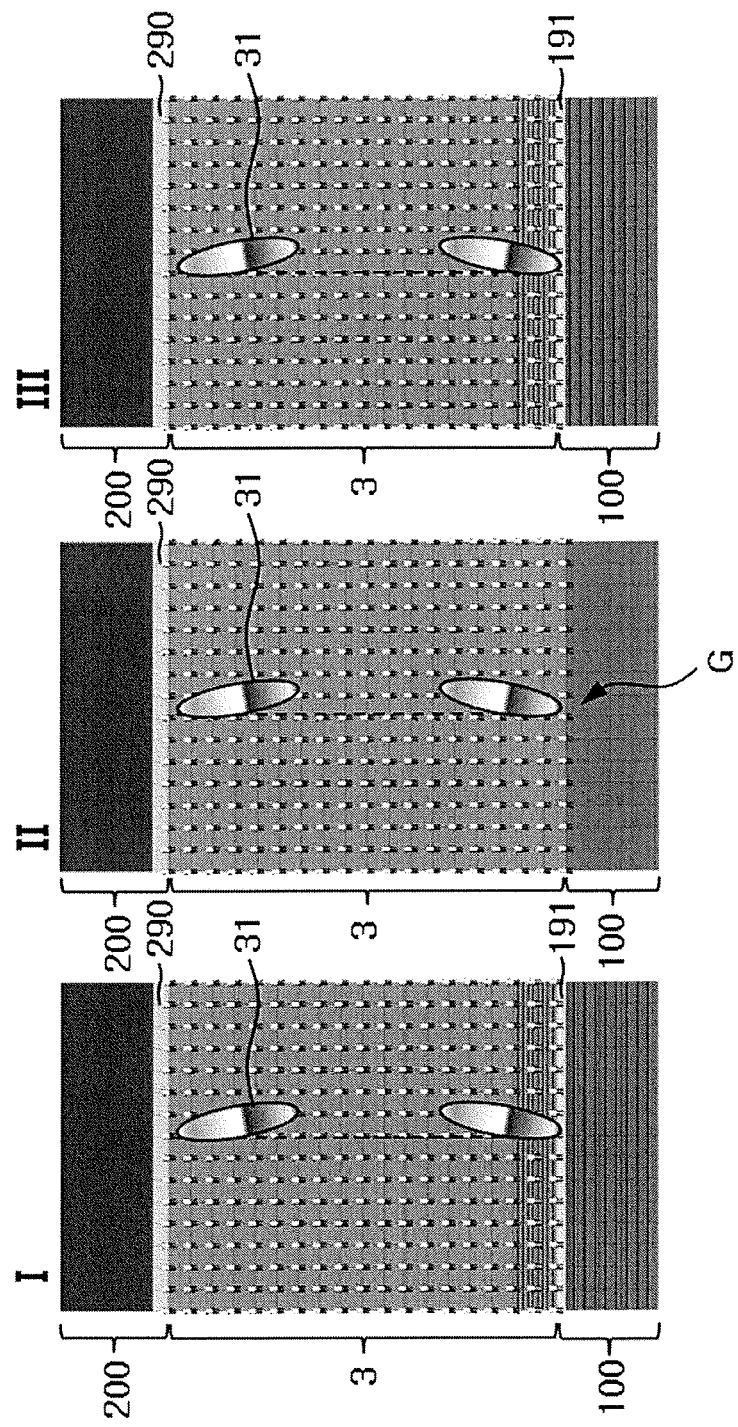
FIG. 5 shows cross-sectional views of the optical modulation device of FIG. 4, which are taken along planes I, II, and III, according to an exemplary embodiment of the present invention.

FIG. 4 shows a perspective view of an arrangement of liquid crystal molecules when no voltage difference is applied between a first plate 100 (e.g., the lower-plate electrode 191) and a second plate 200 (e.g., the upper-plate electrode 290) of an optical modulation device according to an exemplary embodiment of the present invention. Thus, no electric field is generated in the liquid crystal layer 3, the liquid crystal molecules 31 form an initial pre-tilt arrangement. FIG. 5 shows cross-sectional views of the optical modulation device of FIG. 4, which are taken along planes I, II, and III, according to an exemplary embodiment of the present invention. The plane I corresponds to one of a plurality of lower-plate electrodes 191 of the optical modulation device 1 of FIG. 4, the plane II corresponds to a space G between two neighboring lower-plate electrodes 191, and the plane III corresponds to a lower-plate electrode 191 provided near the lower-plate electrode 191. Referring to FIGS. 4 and 5, an arrangement of the liquid crystal molecules 31 may be substantially uniform.

Although a portion of the liquid crystal molecules 31 is illustrated for convenience in FIG. 5 to penetrate into a region of the first plate 100 or the second plate 200, the liquid crystal molecules 31 might not actually penetrate into the region of the first plate 100 or the second plate 200, which is applicable to subsequent drawings.

The liquid crystal molecules 31 provided near the first plate 100 may be initially aligned (e.g., pre-tilted) in a first direction substantially parallel with an alignment direction of the first aligner 11, and the liquid crystal molecules 31 provided near the second plate 200 may be initially aligned (e.g., pre-tiled) in a second direction substantially parallel with an alignment direction of the second aligner 21. Thus, a pre-tilted direction of the liquid crystal molecules 31 provided near the first plate 100 might not be parallel with a pre-tilted direction of the liquid crystal molecules 31 provided near the second plate 200. For example, the pre-tilted direction of the liquid crystal molecules 31 provided near the first plate 100 may be opposite to the pre-tilted direction of the liquid crystal molecules 31 provided near the second plate 200 For example, the liquid crystal molecules 31 provided near the first plate 100 and the liquid crystal molecules 31 provided near the second plate 200 may be inclined to be symmetrical to each other with reference to a horizontal center line extending horizontally along the center of the liquid crystal layer 3 in the cross-sectional view. For example, when the liquid crystal molecules 31 provided near the first plate 100 are inclined to the right with reference to the horizontal center line extending horizontally along the center of the liquid crystal layer 3 in the cross-sectional view, the liquid crystal molecules 31 provided near the second plate 200 may be inclined to the left with reference to the horizontal center line extending horizontally along the center of the liquid crystal layer 3 in the cross-sectional view.

Figure 6:
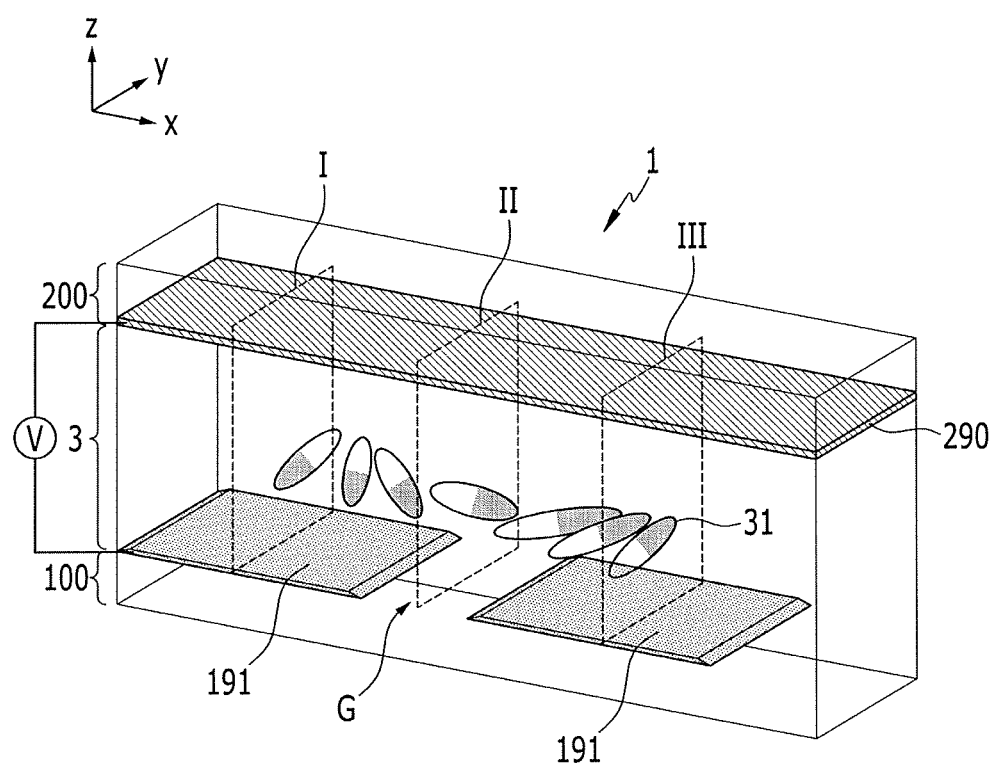
FIG. 6 shows a perspective view of an arrangement of liquid crystal molecules when a voltage difference is applied between a first plate and a second plate of an optical modulation device according to an exemplary embodiment of the present invention.

FIG. 6 shows a perspective view of an arrangement of liquid crystal molecules when a voltage difference is applied between a first plate 100 (e.g., the lower-plate electrode 191) and a second plate 200 (e.g., the upper-plate electrode 290) of an optical modulation device according to an exemplary embodiment of the present invention. The voltage difference may be greater than a threshold voltage and may generate an electric field to the liquid crystal layer 3. The liquid crystal molecules 31 with negative dielectric anisotropy may tend to be inclined in a direction that is substantially perpendicular to a direction of the electric field.

Figure 7:
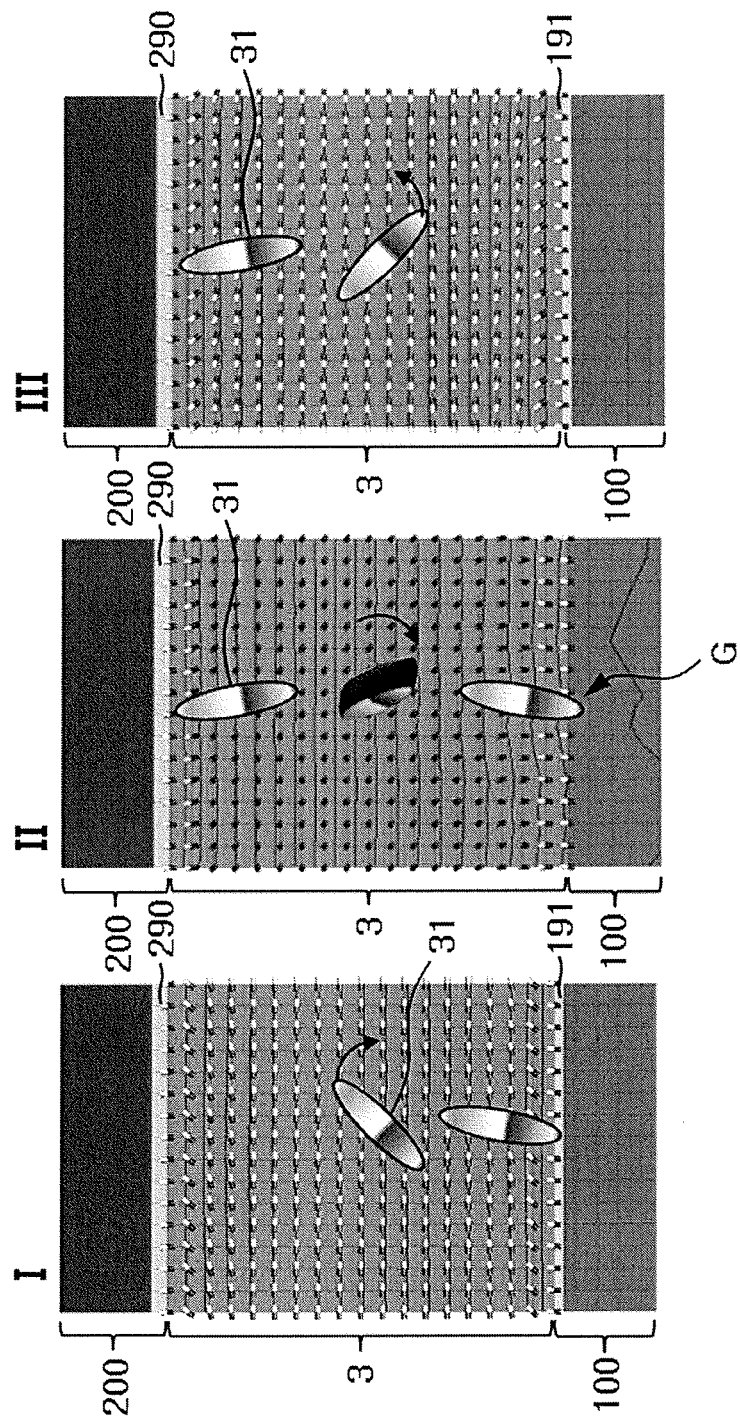
FIG. 7 shows cross-sectional views of the optical modulation device of FIG. 6, which are taken along planes I, II, and III, according to an exemplary embodiment of the present invention.

FIG. 7 shows cross-sectional views of the optical modulation device of FIG. 6, which are taken along planes I, II, and III, according to an exemplary embodiment of the present invention.

Referring to FIG. 6 and FIG. 7, the liquid crystal molecules 31 are inclined substantially in parallel with a surface of the first plate 100 or the second plate 200 to form an in-plane arrangement, and long axes of the liquid crystal molecules 31 are rotated and arranged in an in-plane manner (e.g., in a plan view). The in-plane arrangement may be understood that the long axes of the liquid crystal molecules 31 are arranged to be substantially parallel with the surface of the first plate 100 or the second plate 200.

A rotation angle (e.g., an azimuthal angle) of the liquid crystal molecules 31 in a plan view may be changed according to a voltage applied between the lower-plate electrode 191 and the upper-plate electrode 290. For example, the rotation angle of the liquid crystal molecules 31 may be changed in a spiral shape along a position in the x-axis direction.

A method for forming a forward phase gradient by using an optical modulation device 1 according to an exemplary embodiment of the present invention will now be described with reference to FIG. 8 to FIG. 12 together with the above-described drawings.

Figure 8:
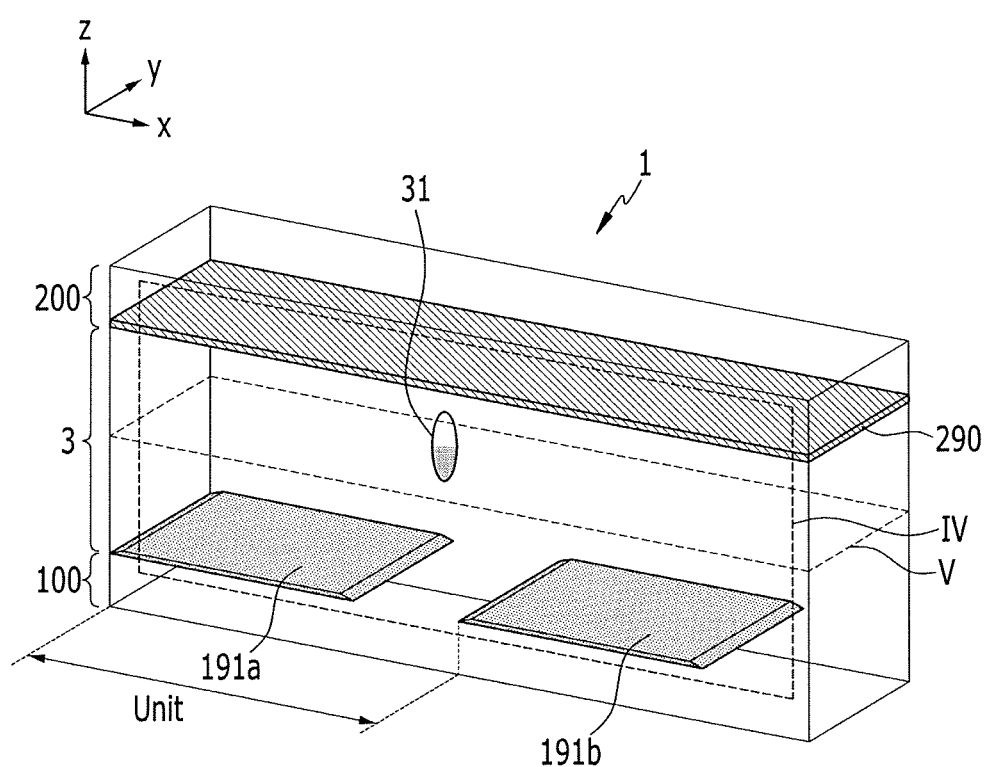
FIG. 8 shows a perspective view of an optical modulation device according to an exemplary embodiment of the present invention.

FIG. 8 shows a perspective view of an optical modulation device 1 according to an exemplary embodiment of the present invention, which may have substantially the same configuration as the above-described exemplary embodiment. The optical modulation device 1 includes a plurality of units of which each may include at least one lower-plate electrode 191. In the present exemplary embodiment, an example in which each unit includes one lower-plate electrode 191 will be described, and two lower-plate electrodes 191a and 191b provided in two neighboring units, respectively, will be focused on. The lower-plate electrodes 191a and 191b will be referred to as a first lower-plate electrode 191a and a second lower-plate electrode 191b, respectively.

Figure 9:
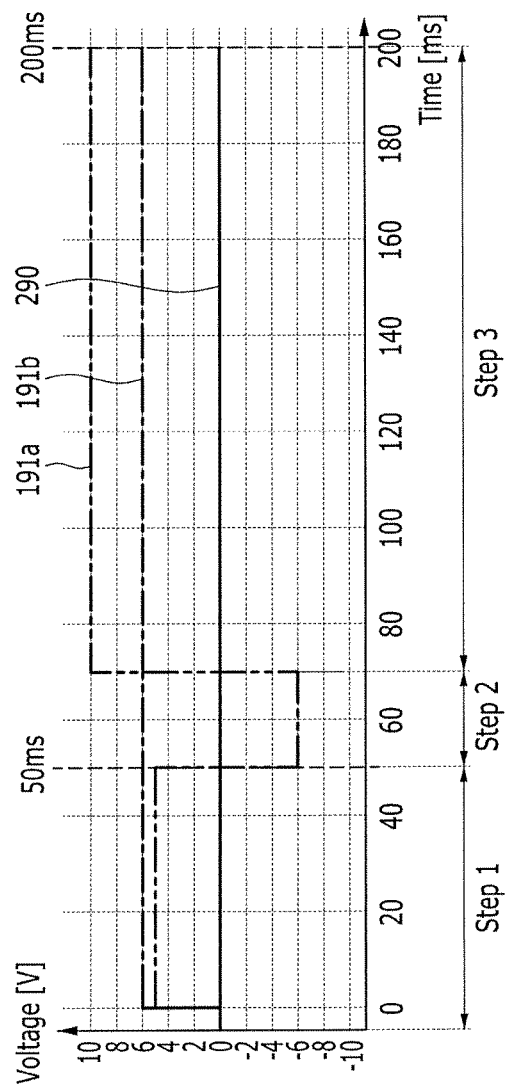
FIG. 9 shows timing diagrams of driving signals for an optical modulation device according to an exemplary embodiment of the present invention.
Figure 10A:
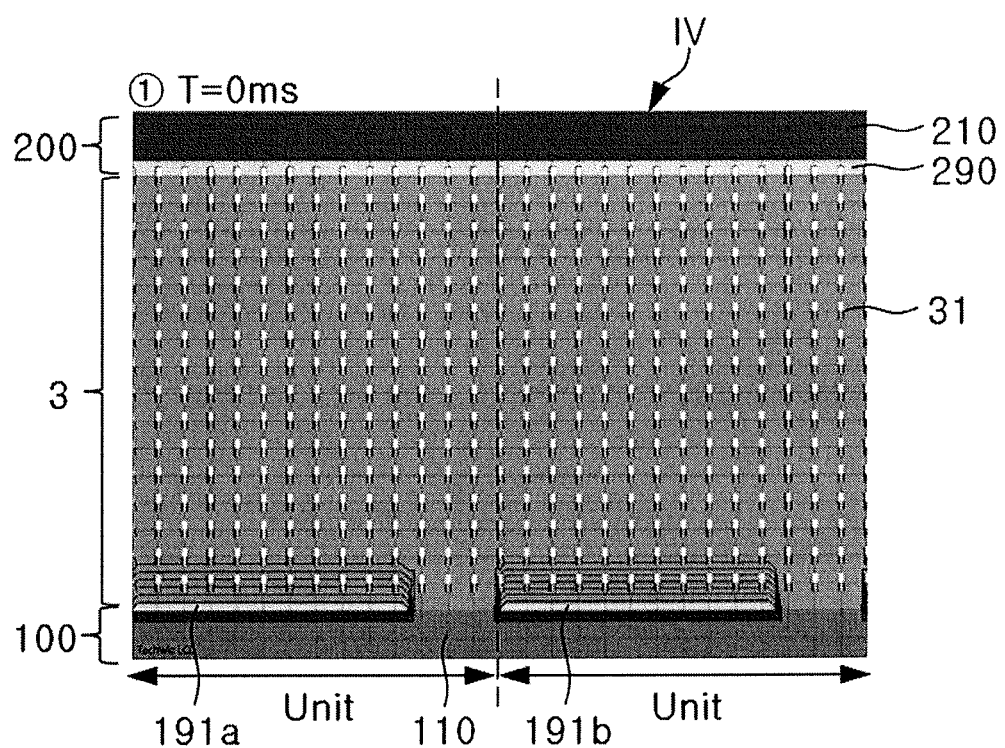
FIG. 10A shows a cross-sectional view of an arrangement of liquid crystal molecules when no voltage difference is applied between a first plate and a second plate of an optical modulation device, which is taken along a plane IV of FIG. 8, according to an exemplary embodiment of the present invention.
Figure 10B:
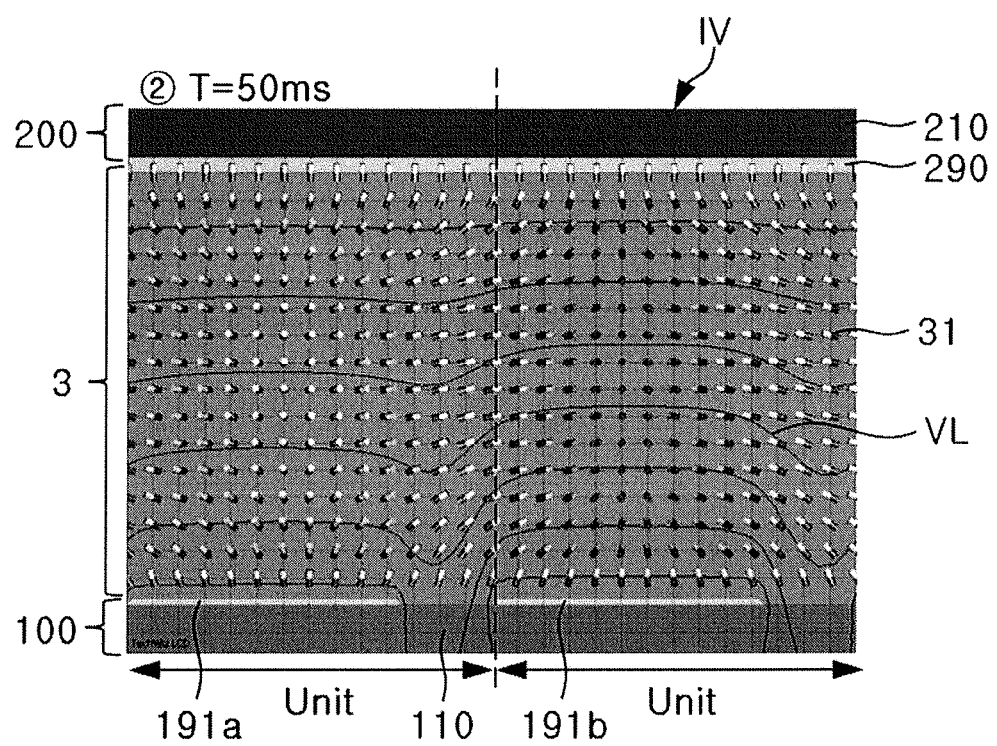
FIG. 10B shows a cross-sectional view of an arrangement of liquid crystal molecules when first-step to third-step driving signals are applied to the optical modulation device of FIG. 10A, which is taken along the plane IV of FIG. 8, according to an exemplary embodiment of the present invention.

FIG. 9 shows timing diagrams of driving signals for an optical modulation device according to an exemplary embodiment of the present invention, FIG. 10A shows a cross-sectional view of an arrangement of liquid crystal molecules when no voltage difference is applied between a first plate 100 and a second plate 200 of an optical modulation device, which is taken along a plane IV of FIG. 8, according to an exemplary embodiment of the present invention, and FIG. 10B shows a cross-sectional view of an arrangement of liquid crystal molecules when first-step to third-step driving signals are applied to the optical modulation device of FIG. 10A, which is taken along the plane IV of FIG. 8, according to an exemplary embodiment of the present invention.

Referring to FIG. 10A, when no voltage difference is imparted between the first and second lower-plate electrodes 191a and 191b and the upper-plate electrode 290 (or when no voltage is applied to the first and second lower-plate electrodes 191a and 191b and the upper-plate electrode 290), the liquid crystal molecules 31 are initially aligned in a substantially vertical direction with respect to planes of the first plate 100 and the second plate 200, and as described, the liquid crystal molecules 31 near the first and second plates 100 and 200 may form pre-tilts in the alignment directions of the first plate 100 and the second plate 200, respectively. For example, a zero voltage difference may be applied between the upper plate electrode 290 and each of the first and second lower-plate electrodes 191a and 191b. For example, a voltage difference less than a threshold voltage Vth may be applied therebetween. The threshold voltage Vth may be a voltage at which an arrangement of the liquid crystal molecules 31 starts to change.

Referring to FIG. 9, for the optical modulation device 1 according to an exemplary embodiment of the present invention to form a forward phase gradient, the first and second lower-plate electrodes 191a and 191b and the upper-plate electrode 290 may receive a first-step driving signal for one frame. In the first step (step 1), a voltage difference is formed between the upper-plate electrode 290 of the second plate 200 and each of the first and second lower-plate electrodes 191a and 191b of the first plate 100, and a voltage difference is formed between the first lower-plate electrode 191a and the second lower-plate electrode 191b. For example, an absolute value of a second voltage supplied to the second lower-plate electrode 191b may be greater than an absolute value of a first voltage supplied to the first lower-plate electrode 191a. Further, a third voltage supplied to the upper-plate electrode 290 may be different from the first voltage and the second voltage supplied to the first and second lower-plate electrodes 191a and 191b. For example, an absolute value of the third voltage supplied to the upper-plate electrode 290 may be less than the absolute value of the first voltage and the absolute value of the second voltage, respectively, supplied to the first and second lower-plate electrodes 191a and 191b. For example, a first voltage of 5 volts may be supplied to the first lower-plate electrode 191a, a second voltage of 6 volts may be supplied to the second lower-plate electrode 191b, and a third voltage of 0 volt may be supplied to the upper-plate electrode 290.

When each unit includes a plurality of lower-plate electrodes 191 differing from the illustration, substantially the same voltage may be supplied to the plurality of lower-plate electrodes 191 in each unit or voltages sequentially changing for each of at least one lower-plate electrode 191 may be supplied to the plurality of lower-plate electrodes 191 in each unit. For example, voltages applied to first lower-plate electrodes 191 in a first unit of neighboring units may gradually increase for each of at least one lower-plate electrode 191, and voltages applied to second lower-plate electrodes 191 in a second unit of the neighboring units may gradually decrease for each of at least one lower-plate electrode 191.

Voltages supplied to the lower-plate electrodes 191 of each unit may have same polarities such as positive polarities or negative polarities with respect to the voltage of the upper-plate electrode 290. Further, the polarities of the voltages supplied to the lower-plate electrodes 191 may be inverted for each of at least one frame.

Figure 11:
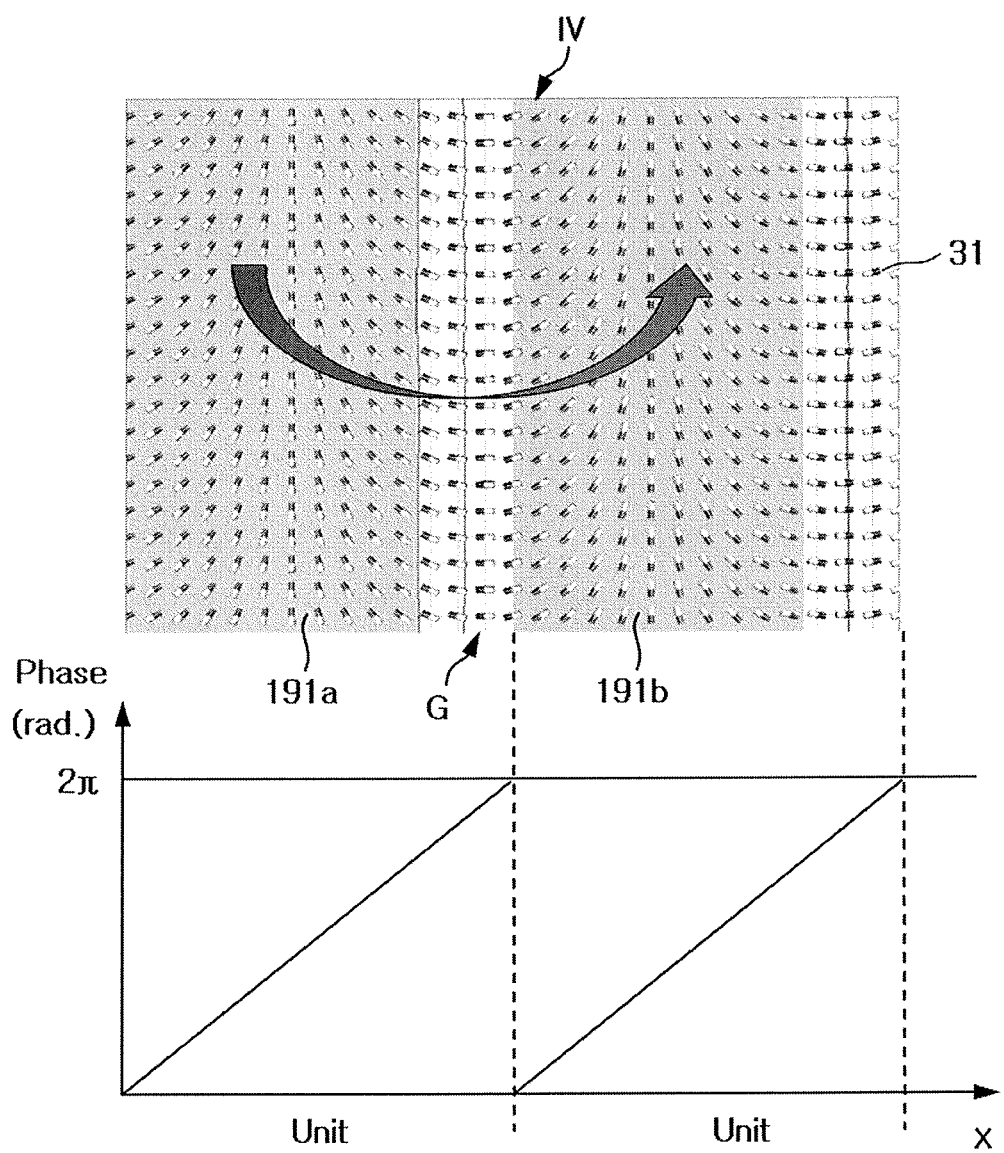
FIG. 11 shows a cross-sectional view of an arrangement of liquid crystal molecules which are stabilized when a first-step driving signal is applied to an optical modulation device according to an exemplary embodiment of the present invention, which is taken along a plane V of FIG. 8, and shows a graph illustrating a corresponding phase change.
Figure 12:
FIG. 12 shows an arrangement of liquid crystal molecules which are stabilized when a first-step driving signal is applied to an optical modulation device according to an exemplary embodiment of the present invention.

FIG. 11 shows a cross-sectional view of an arrangement of liquid crystal molecules which are stabilized when a first-step driving signal is applied to an optical modulation device according to an exemplary embodiment of the present invention, which is taken along a plane V of FIG. 8, and shows a graph illustrating a corresponding phase change, and FIG. 12 shows an arrangement of liquid crystal molecules which are stabilized when a first-step driving signal is applied to an optical modulation device according to an exemplary embodiment of the present invention.

As shown in FIG. 10B and FIG. 11, the liquid crystal molecules 31 are rearranged according to an electric field generated in the liquid crystal layer 3. For example, most of the liquid crystal molecules 31 are inclined substantially in parallel with the surface of the first plate 100 or the second plate 200 to form an in-plane arrangement. For example, when the long axes of the liquid crystal molecules 31 are rotated in an in-plane manner (e.g., in a plan view), the liquid crystal molecules 31 may form a spiral arrangement, as shown in FIG. 11 and FIG. 12, and may form a u-shaped arrangement. An azimuthal angle of the long axes of the liquid crystal molecules 31 may be changed substantially from 0 to 180 degrees with a period of a pitch of the lower-plate electrode 191. A portion in which the azimuthal angle thereof is changed substantially from 0 to 180 degrees may form a u-shaped arrangement of the liquid crystal molecules 31.

A predetermined time may be taken until the arrangement of the liquid crystal molecules 31 is stabilized after the optical modulation device 1 receives a first-step driving signal, and the optical modulation device 1 forming a forward phase gradient may continuously receive the first-step driving signal.

Referring to FIG. 11, a region in which the liquid crystal molecules 31 are rotated by 180 degrees in the x-axis direction and arranged may be defined as one unit. In the present exemplary embodiment, the one unit may include a space G between a first lower-plate electrode 191a and a second lower-plate electrode 191b provided near the first lower-plate electrode 191a.

As described above, when the optical modulation device 1 satisfies Equation 1 and acts as a half-wave plate, a rotation direction of a circularly polarized light, which is incident upon the optical modulation device 1, may be changed to be opposite. FIG. 11 shows a phase change according to a position in the x-axis direction when the right circularly polarized light is incident upon the optical modulation device 1. The right circularly polarized light passed through the optical modulation device 1 may be changed to a left circularly polarized. Since a phase delay value of the liquid crystal layer 3 varies in the x-axis direction, a phase of the circularly polarized light may consecutively be changed.

When an optical axis of the optical modulation device 1 acting as a half-wave plate is rotated by $\phi$ in an in-plane manner (e.g., in a plan view), a phase of the light passing through the half-wave plate is changed by $2\phi$. Thus, as shown in FIG. 11, a phase of the light passing through one unit of the optical modulation device 1 is changed from 0 to $2\pi$ radians in the x-axis direction, which refers to as the forward phase gradient. The one unit may be a unit in which the azimuthal angle of the long axes of the liquid crystal molecules 31 is changed by 180 degrees. The phase change may be repeated for each unit, and thus, a forward phase gradient portion of a lens that changes a direction of light may be realized by using the optical modulation device 1.

A method for realizing an optical modulation device 1 as a forward phase gradient shown in FIG. 11 according to an exemplary embodiment of the present invention will now be described with reference to FIG. 13 to FIG. 16 together with the above-described drawings.

Figure 13:
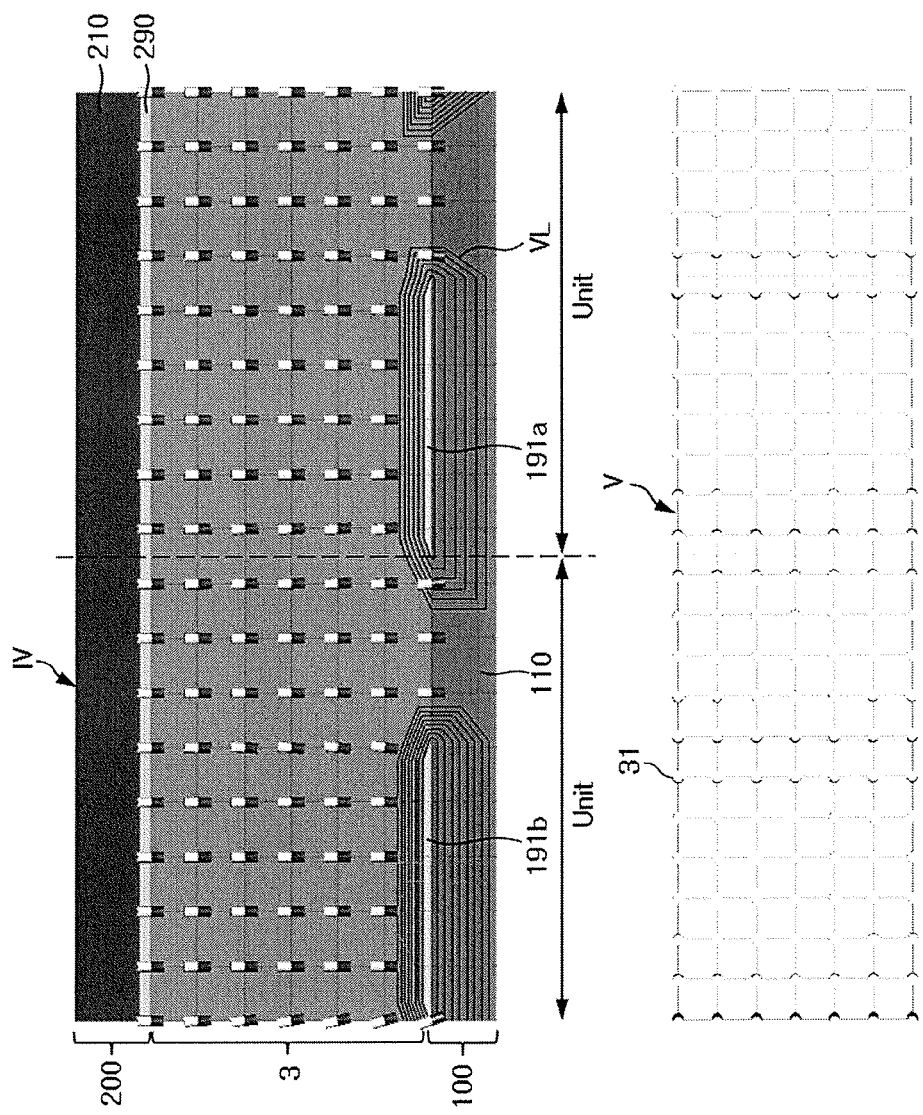
FIG. 13 shows cross-sectional views of an arrangement of liquid crystal molecules when no voltage difference is applied between a first plate and a second plate of an optical modulation device according to an exemplary embodiment of the present invention, which are taken along the planes IV and V of FIG. 8.

FIG. 13 shows cross-sectional views of an arrangement of liquid crystal molecules 31 when no voltage difference is applied between a first plate 100 and a second plate 200 of an optical modulation device according to an exemplary embodiment of the present invention, which are taken along the planes IV and V of FIG. 8. For example, no voltage difference is applied between the upper-plate electrode 290 of the second plate 200 and each of the first and second lower-plate electrodes 191*a* and 191*b* of the first plate 100. FIG. 13 to FIG. 16 show a portion that moves in the horizontal direction by one unit from the above-described drawings.

The liquid crystal molecules 31 are initially aligned in a substantially vertical direction with respect to the surfaces of the first plate 100 and the second plate 200, and the liquid crystal molecules 31 near the first and second plates 100 and 200 may form pre-tilts in the respective alignment directions R1 and R2 of the first plate 100 and the second plate 200 as described above. An equipotential line VL is shown on the liquid crystal layer 3.

Figure 14:
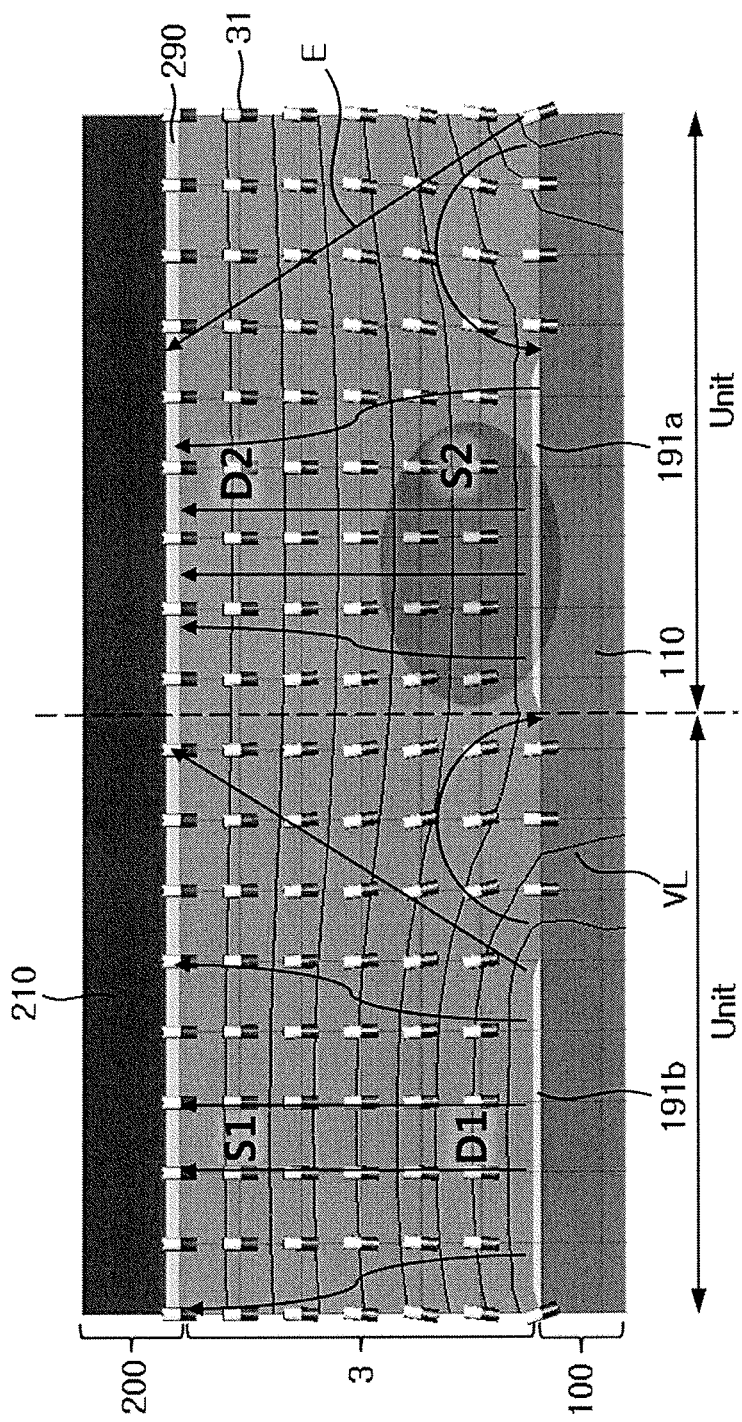
FIG. 14 shows a cross-sectional view of an arrangement of liquid crystal molecules when a first-step driving signal is applied to an optical modulation device according to an exemplary embodiment of the present invention, which is taken along the plane IV of FIG. 8.

FIG. 14 shows a cross-sectional view of an arrangement of liquid crystal molecules 31 when a first-step driving signal is applied to an optical modulation device according to an exemplary embodiment of the present invention, which is taken along the plane IV of FIG. 8. For example, the first-step driving signal may be applied between the upper-plate electrode 290 of the second plate 200 and each of the first and second lower-plate electrodes 191*a* and 191*b* of the first plate 100. An electric field E is generated between the first plate 100 and the second plate 200, and a corresponding equipotential line VL is shown. For example, the first and second lower-plate electrodes 191*a* and 191*b* each have edge sides, and thus, a fringe field is formed between the edge sides of each of the first and second lower-plate electrodes 191*a* and 191*b* and the upper-plate electrode 290.

When the first-step driving signal is applied to the first and second lower-plate electrodes 191*a* and 191*b* and the upper-plate electrode 290, intensity of the electric field in a region D1 near the first plate 100 is greater than intensity of the electric field in a region S1 near the second plate 200 in a liquid crystal layer 3 corresponding to a first unit including the second lower-plate electrode 191*b*. In addition, when the first-step driving signal is applied to the first and second lower-plate electrodes 191*a* and 191*b* and the upper-plate electrode 290, intensity of the electric field in a region S2 near the first plate 100 is less than intensity of the electric field in a region D2 near the second plate 200 in a liquid crystal layer 3 corresponding to a second unit including the first lower-plate electrode 191*a*.

Referring to FIG. 14, the voltages supplied to the first lower-plate electrode 191*a* and the second lower-plate electrode 191*b* disposed in the two neighboring units, respectively may differ from each other, and thus, the intensity of the electric field in the region S2 near the first lower-plate electrode 191*a* may be less than the intensity of the electric field in the region D1 near the second lower-plate electrode 191*b*. For this purpose, as shown in FIG. 9, the voltage supplied to the second lower-plate electrode 191*b* may be greater than the voltage supplied to the first lower-plate electrode 191*a*. A voltage different from the voltages supplied to the first and second lower-plate electrodes 191*a* and 191*b* may be supplied to the upper-plate electrode 290. For example, a voltage less than the voltages supplied to the first and second lower-plate electrodes 191*a* and 191*b* may be supplied to the upper-plate electrode 290.

Figure 15:
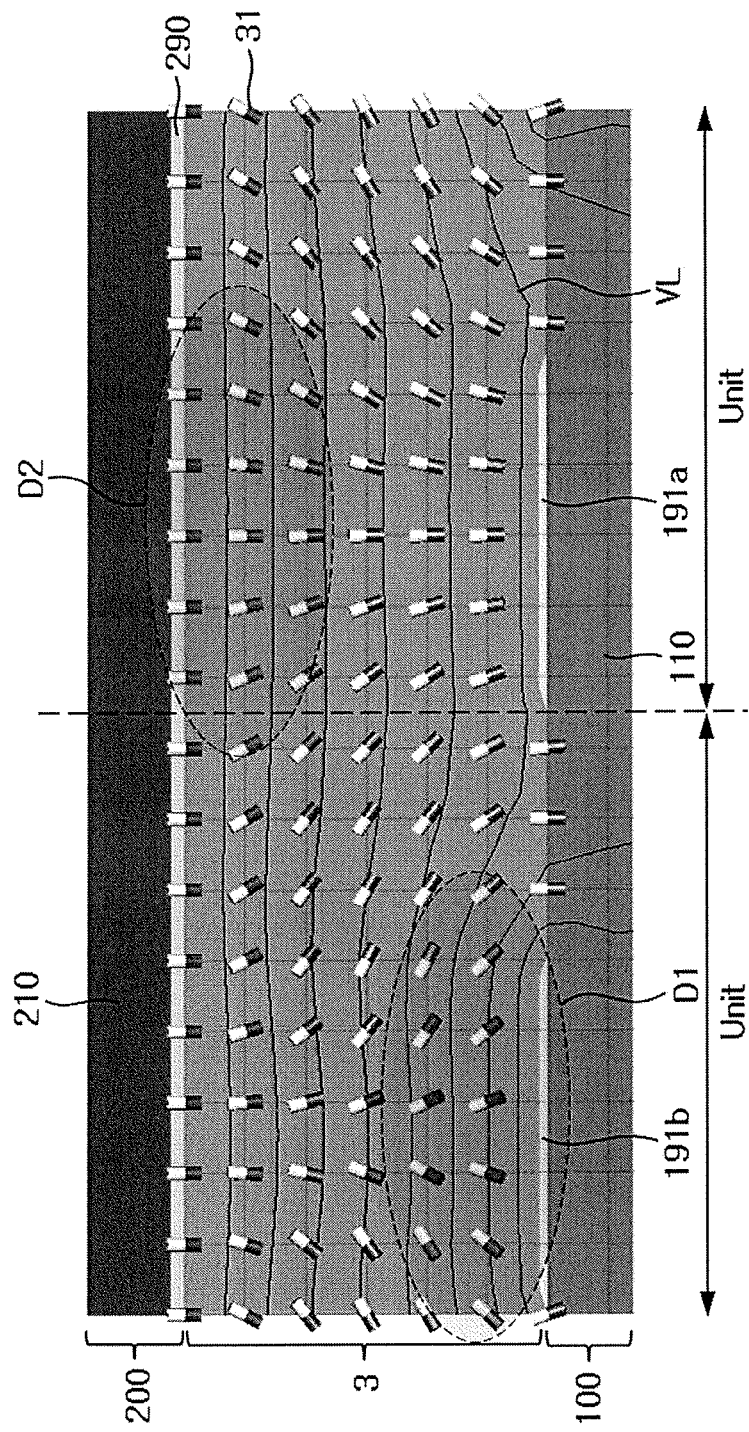
FIG. 15 shows a cross-sectional view of an arrangement of liquid crystal molecules before the liquid crystal molecules are stabilized after a first-step driving signal is applied to an optical modulation device according to an exemplary embodiment of the present invention, which is taken along the plane IV of FIG. 8.

FIG. 15 shows a cross-sectional view of an arrangement of liquid crystal molecules 31 before the liquid crystal molecules are stabilized after a first-step driving signal is applied to an optical modulation device according to an exemplary embodiment of the present invention, which is taken along the plane IV of FIG. 8. The liquid crystal molecules 31 may react to an electric field E generated in a liquid crystal layer 3 when the first-step driving signal is supplied to the optical modulation device 1. As described above, the electric field in the region D1 near the second lower-plate electrode 191*b* is stronger than the electric field in the region S1 near the upper electrode 290 in the liquid crystal layer 3 corresponding to the first unit including the second lower-plate electrode 191*b*, and thus, a direction in which the liquid crystal molecules 31 in the region D1 are inclined may determine an in-plane arrangement direction of the liquid crystal molecules 31 corresponding to the second lower-plate electrode 191*b*. For example, in the region that corresponds to the second lower-plate electrode 191*b*, the liquid crystal molecules 31 are inclined in an initial pre-tilt direction of the liquid crystal molecules 31 near the first plate 100 to form an in-plane arrangement of the liquid crystal molecules 31.

In addition, the electric field in the region D2 near the upper-plate electrode 290 opposite to the first lower-plate electrode 191*a* is stronger than the electric field in the region S2 near the first lower-plate electrode 191*a* in the liquid crystal layer 3 corresponding to the second unit including the first lower-plate electrode 191*a*, and thus, a direction in which the liquid crystal molecules 31 in the region D2 are inclined may determine an in-plane arrangement direction of the liquid crystal molecules 31. For example, in the region corresponding to the first lower-plate electrode 191*a*, the liquid crystal molecules 31 are inclined in an initial pre-tilt direction of the liquid crystal molecules 31 near the second plate 200 to form an in-plane arrangement of the liquid crystal molecules 31. The initial pre-tilt direction of the liquid crystal molecules 31 near the first plate 100 in the first unit including the second lower-plate electrode 191*b* is opposite to the initial pre-tilt direction of the liquid crystal molecules 31 near the second plate 200 in the second unit including the first lower-plate electrode 191*a*. Thus, the direction in which the liquid crystal molecules 31 corresponding to the first lower-plate electrode 191*a* are inclined is opposite to the direction in which the liquid crystal molecules 31 corresponding to the second lower-plate electrode 191*b* are inclined.

Figure 16:
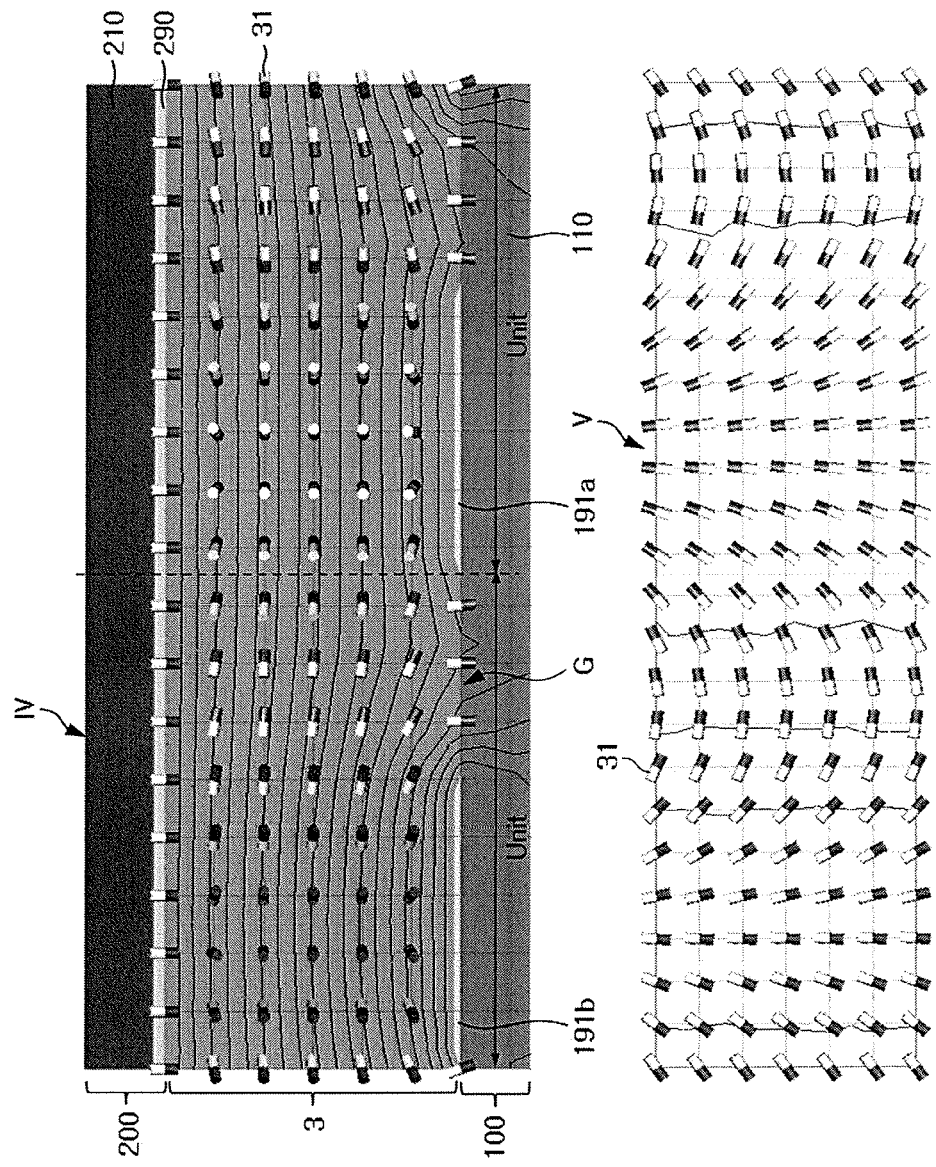
FIG. 16 shows cross-sectional views of an arrangement of liquid crystal molecules that are stabilized after a first-step driving signal is applied to an optical modulation device according to an exemplary embodiment of the present invention, which are taken along the planes IV and V of FIG. 8.

FIG. 16 shows cross-sectional views of an arrangement of liquid crystal molecules 31 that are stabilized after a first-step driving signal is applied to an optical modulation device according to an exemplary embodiment of the present invention, which are taken along the planes IV and V of FIG. 8. The in-plane arrangement direction of the liquid crystal molecules 31 corresponding to the first lower-plate electrode 191a is substantially opposite to the in-plane arrangement direction of the liquid crystal molecules 31 corresponding to the second lower-plate electrode 191b, and the liquid crystal molecules 31 corresponding to the space G between the neighboring first lower-plate electrode 191a and the second lower-plate electrode 191b are consecutively rotated in the x-axis direction to form a spiral arrangement.

The liquid crystal layer 3 of the optical modulation device 1 may generate a phase delay varying in the x-axis direction to the incident light.

Referring to FIG. 16, a region in which the liquid crystal molecules 31 are rotated by 180 degrees in the x-axis direction and arranged is defined as one unit. The one unit may include a space G between the first lower-plate electrode 191a and the second lower-plate electrode 191b. For example, a phase change of light incident upon the optical modulation device 1 varies depending on a position in the x-axis direction when the light is a right circularly polarized light and the optical modulation device 1 forms a forward phase gradient according to an exemplary embodiment of the present invention. The right circularly polarized light may be changed into a left circularly polarized light. In addition, since the phase delay (e.g., phase change) in the liquid crystal layer 3 varies depending on the x-axis direction, the phase of the circularly polarized light may be consecutively changed, for example, depending on the x-axis direction.

Figure 17:
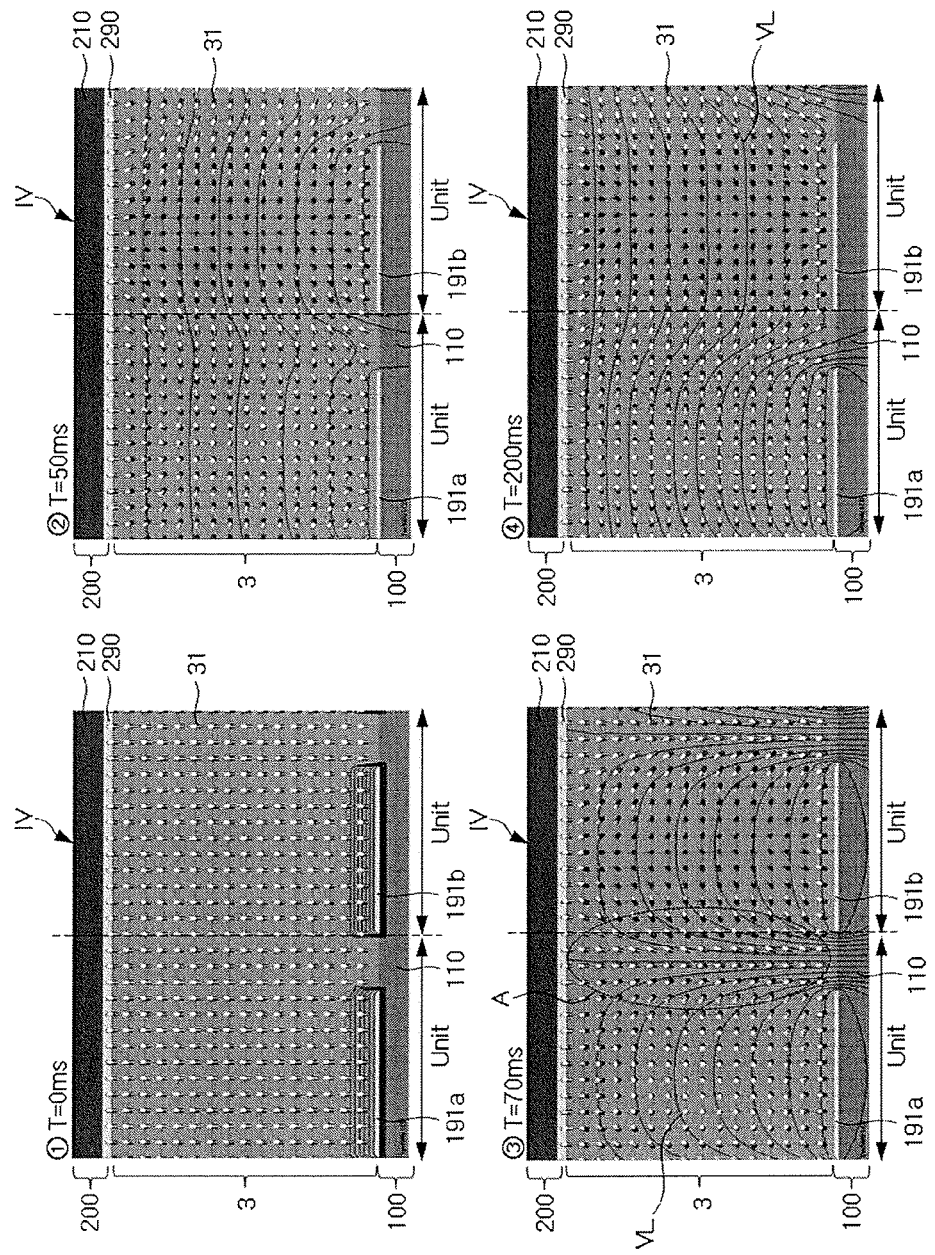
FIG. 17 shows cross-sectional views of an arrangement of liquid crystal molecules before no voltage difference is applied between a first plate and a second plate of an optical modulation device according to an exemplary embodiment of the present invention and after a first-step driving signal is applied, which are taken along the plane IV of FIG. 8.
Figure 18:
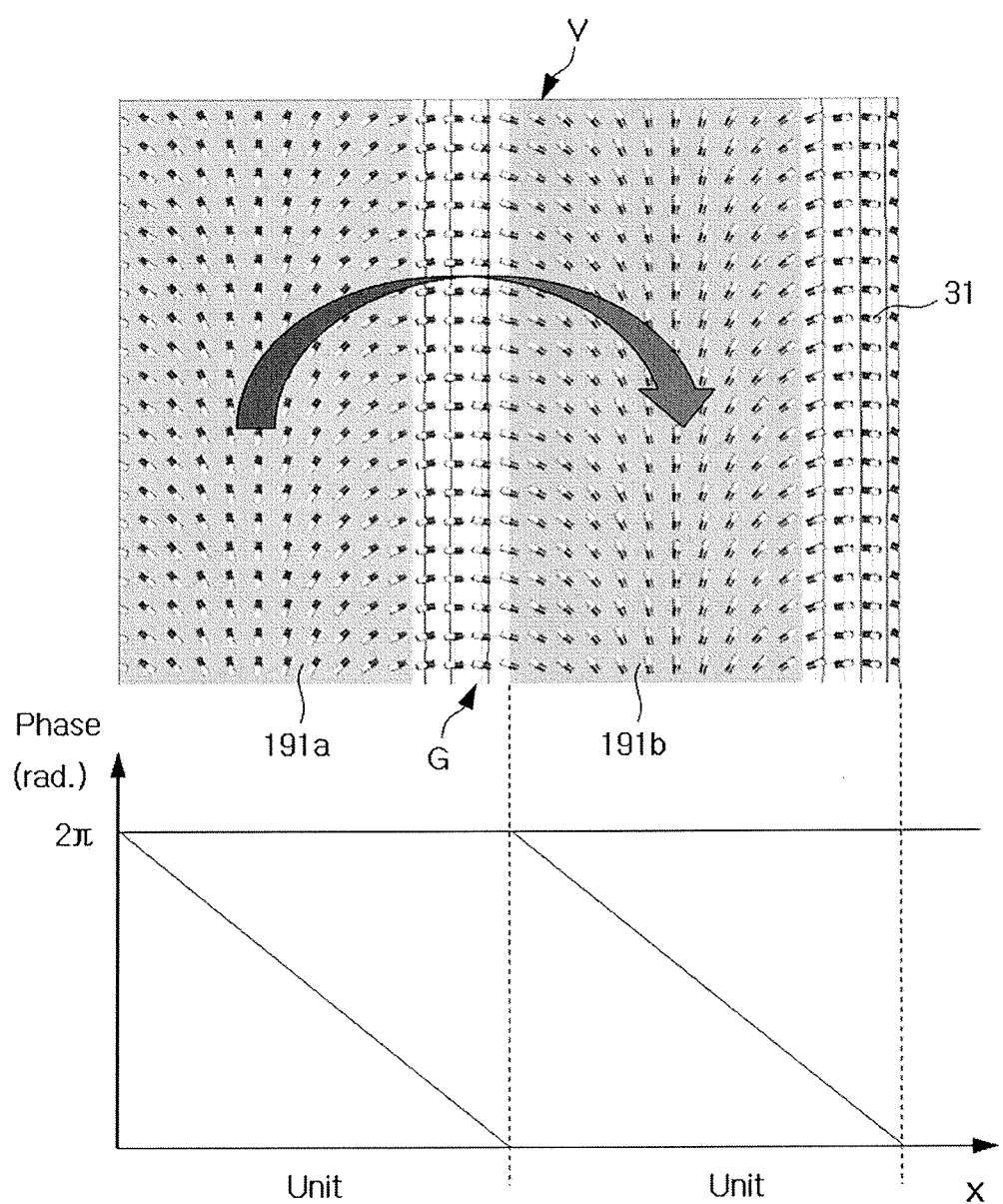
FIG. 18 and FIG. 19 show cross-sectional views of an arrangement of liquid crystal molecules which are stabilized when first-step to third-step driving signals are applied to an optical modulation device according to an exemplary embodiment of the present invention, which are taken along the plane V of FIG. 8.
Figure 19:

FIG. 17 shows cross-sectional views of an arrangement of liquid crystal molecules before no voltage difference is applied between a first plate 100 and a second plate 200 of an optical modulation device according to an exemplary embodiment of the present invention and after a first-step driving signal is applied, which are taken along the plane IV of FIG. 8, FIGS. 18 and 19 show cross-sectional views of an arrangement of liquid crystal molecules which are stabilized when first-step to third-step driving signals are applied to an optical modulation device according to an exemplary embodiment of the present invention, which are taken along the plane V of FIG. 8.

A method for realizing a reverse phase gradient by using an optical modulation device 1 according to an exemplary embodiment of the present invention will now be described with reference to FIG. 9 to FIG. 11 and FIG. 17 to FIG. 19.

Referring to a top left drawing of FIG. 17, when no voltage is supplied to the first and second lower-plate electrodes 191a and 191b and the upper-plate electrode 290, the liquid crystal molecules 31 are initially aligned in a substantially vertical direction with respect to plane sides of the first plate 100 and the second plate 200, and as described, liquid crystal molecules 31 may form a pre-tilt in the alignment directions of the first plate 100 and the second plate 200.

Referring to FIG. 9, when the optical modulation device 1 receives a first-step driving signal and a predetermined time (e.g., 50 ms) passes, the first and second lower-plate electrodes 191a and 191b and the upper-plate electrode 290 may receive a second-step driving signal.

In the second step (step 2), voltages with opposite polarities to each other may be supplied to the neighboring first and second lower-plate electrodes 191a and 191b with reference to a voltage supplied to the upper-plate electrode 290. For example, a voltage difference of −6 volts may be applied between the first lower-plate electrode 191a and the upper-plate electrode 290, a voltage difference of 6 volts may be applied between the second lower-plate electrode 191b and the upper-plate electrode 290, and vice versa.

As shown in a bottom left drawing of FIG. 17, an equipotential line VL is formed in the liquid crystal molecules 31, liquid crystal molecules 31 in a region A corresponding to a space G between the first and second lower-plate electrodes 191a and 191b are arranged in a substantially vertical direction with respect to the surfaces of the first and second plates 100 and 200, and in-plane spiral arrangement is not formed in, for example, the space G.

A period of the second step (step 2) may be, for example, 20 ms, but the present invention is not limited thereto.

Each unit of the optical modulation device 1 may include a plurality of lower-plate electrodes 191. In this case, substantially the same voltage may be supplied to the plurality of lower-plate electrodes 191 in each unit, or voltages sequentially changing for each of at least one lower-plate electrode 191 may be supplied to the plurality of lower-plate electrodes 191 in each unit. For example, voltages supplied to lower-plate electrodes 191 of a first unit may have opposite polarities to voltages supplied to lower-plate electrodes 191 of a second unit adjacent to the first unit with reference to the voltage of the upper-plate electrode 290. Further, polarities of the voltages supplied to the lower-plate electrodes 191 may be inverted for each of at least one frame.

When the optical modulation device 1 receives a second-step driving signal and a predetermined time (e.g., 20 ms) passes, the first and second lower-plate electrodes 191a and 191b and the upper-plate electrode 290 may receive a third-step driving signal and may maintain the third-step driving signal for the rest of period of a corresponding frame.

Voltage levels applied to the first and second lower-plate electrodes 191a and 191b and the upper-plate electrode 290 in the third step (step 3) are similar to those in the first step (step 1), but the respective voltage levels supplied to the first lower-plate electrode 191a and the second lower-plate electrode 191b in the third step (step 3) may be opposite to the respective voltage levels supplied to the first plate electrode 191a and the second lower-plate electrode 191b in the first step (step 1). For example, when a voltage applied to the first lower-plate electrode 191a is less than a voltage applied to the second lower-plate electrode 191b in the first step (step 1), a voltage applied to the first lower-plate electrode 191a may be greater than a voltage supplied to the second lower-plate electrode 191b in the third step (step 3). For example, in the third step (step 3), a voltage of 10 volts may be supplied to the first lower-plate electrode 191a, a voltage of 6 volts may be supplied to the second lower-plate electrode 191b, and a voltage of 0 volt may be supplied to the upper-plate electrode 290.

As shown in a bottom right drawing of FIG. 17, the liquid crystal molecules 31 are rearranged by the electric field generated in the liquid crystal layer 3. For example, most of the liquid crystal molecules 31 are inclined substantially parallel with the surface of the first plate 100 or the second plate 200 to form an in-plane arrangement. For example, when the long axes of the liquid crystal molecules 31 are rotated in an in-plane manner (e.g., in a plan view), the liquid crystal molecules 31 form a spiral arrangement in the plan view as shown in FIG. 18 and FIG. 19, and form an n-shaped arrangement. An azimuthal angle of the long axes of the liquid crystal molecules 31 may change substantially from 180 to 0 degrees with a period of a pitch of the lower-plate electrode 191. A portion in which the azimuthal angle of the long axes of the liquid crystal molecules 31 is changed substantially from 180 to 0 degrees may form an n-shaped arrangement.

A predetermined time may be taken until the arrangement of the liquid crystal molecules 31 is stabilized after the optical modulation device 1 receives a third-step driving signal, and the optical modulation device 1 forming a reverse phase gradient may continuously receive the third-step driving signal.

As described above, when the optical modulation device 1 satisfies Equation 1 and acts as a half-wave plate, a rotation direction of the circularly polarized light, which is incident upon the optical modulation device 1, may be changed to be opposite. FIG. 18 shows a phase change according to a position of the x-axis direction when the right circularly polarized light is incident upon the optical modulation device 1. The right circularly polarized light passing through the optical modulation device 1 may be changed to a left circularly polarized light, and since a phase delay value of the liquid crystal layer 3 varies in the x-axis direction, a phase of the circularly polarized light may consecutively be changed.

When an optical axis of the optical modulation device 1 acting as a half-wave plate is rotated by $\phi$ in an in-plane manner (e.g., in a plan view), a phase of the light passing through the half-wave plate is changed by $2\phi$. Thus, as shown in FIG. 18, a phase of the light one unit of the optical modulation device 1 is changed from $2\pi$ radians to 0 in the x-axis direction, which refers to as the reverse phase gradient. The one unit may be a unit in which the azimuthal angle of the long axes of the liquid crystal molecules 31 is changed by 180 degrees. The phase change may be repeated for each unit, and thus, a reverse phase gradient portion of a lens that changes a direction of light may be realized by using the optical modulation device 1.

A method for realizing an optical modulation device 1 as a reverse phase gradient may be substantially the same as the method for realizing an optical modulation device 1 as a forward phase gradient. Thus, detailed description thereof will be omitted.

According to an exemplary embodiment of the present invention, a phase of light may be modulated in various ways by controlling rotation angles in an in-plan manner (e.g., in a plan view) of the liquid crystal molecules 31 according to a method of applying a driving signal, and thus, various diffraction angles of light may be formed.

Figure 20:
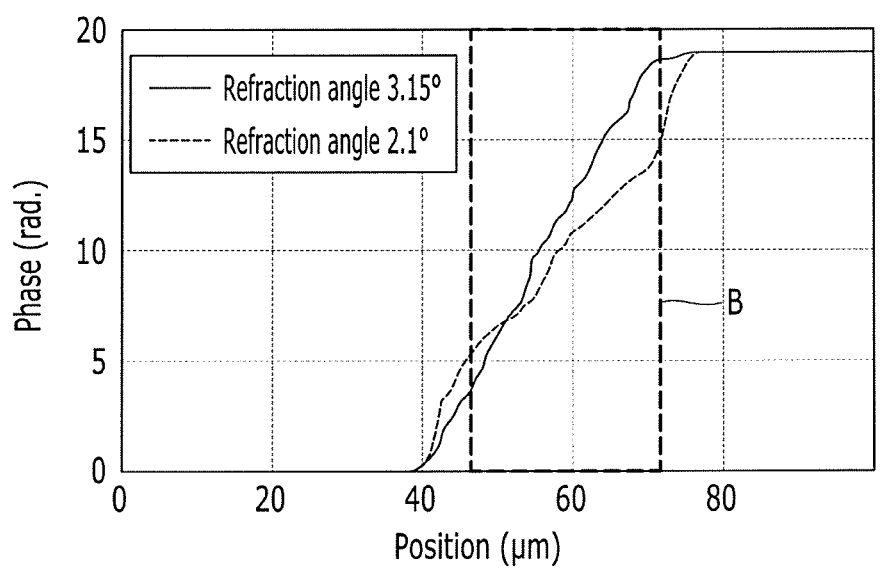
FIG. 20 and FIG. 21 show graphs illustrating a phase change depending on a position of light passing through an optical modulation device according to an exemplary embodiment of the present invention.
Figure 21:
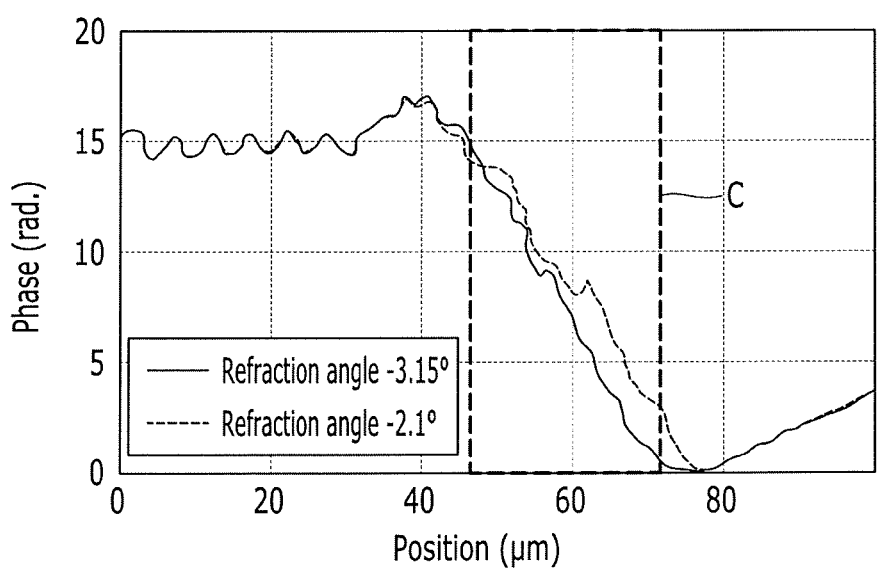

FIG. 20 and FIG. 21 show graphs illustrating a phase change depending on a position of light passing through an optical modulation device according to an exemplary embodiment of the present invention.

Referring to FIG. 20, when the above-described first-step driving signal is applied to the optical modulation device 1, a forward phase gradient along a position in a portion B is formed. Referring to FIG. 21, when the above-described first-step to third-step driving signals are sequentially applied to the optical modulation device 1, a reverse phase gradient along a position in a portion C is formed.

Figure 22:
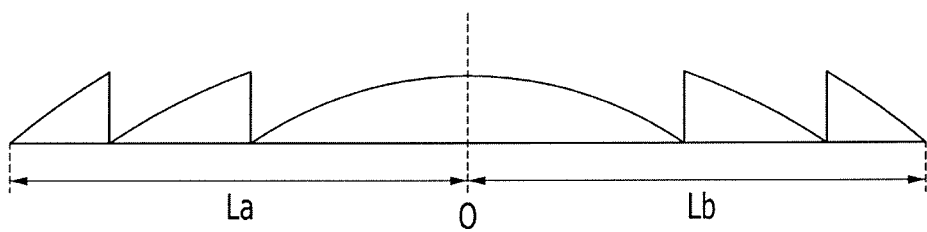
FIG. 22 shows a phase change of light depending on a position of a lens that is realizable by using an optical modulation device according to an exemplary embodiment of the present invention.

FIG. 22 shows a phase change of light depending on a position of a lens that is realizable by using an optical modulation device according to an exemplary embodiment of the present invention.

The optical modulation device 1 according to an exemplary embodiment of the present invention may form a forward phase gradient and/or a reverse phase gradient by differently applying a driving signal depending on a position of the optical modulation device 1, and a lens (e.g., a Fresnel lens) may thus be formed. FIG. 22 shows an exemplary lens realizable by the optical modulation device 1 and indicates a phase change depending on a position of the lens. For example, the Fresnel lens uses an optical characteristic of a Fresnel zone plate, phase distribution thereof is periodically repeated, and valid phase delay thereof may be equal or similar to that of a solid convex lens or a green lens.

As shown in FIG. 22, with reference to a center O of a single Fresnel lens, a left portion La includes a plurality of forward phase gradient regions of which widths in the x-axis direction may be different from each other, and a right portion Lb includes a plurality of reverse phase gradient regions of which widths in the x-axis direction may be different from each other. Therefore, a portion of the optical modulation device 1 corresponding to the left portion La of the Fresnel lens may form a forward phase gradient by applying the above-described first-step driving signal, and a portion of the optical modulation device 1 corresponding to the right portion Lb of the Fresnel lens may form a reverse phase gradient by sequentially applying the first-step (step 1), second-step (step 2), and third-step (step 3) driving signals.

The forward phase gradients included in the left portion La of the Fresnel lens may have different widths in the x-axis direction, and thus, widths of lower-plate electrodes 191 of the optical modulation device 1 corresponding to the respective forward phase gradient portions and/or the number of the lower-plate electrodes 191 in one unit may be appropriately controlled. In addition, the reverse phase gradients included in the right portion Lb of the Fresnel lens may have different widths in the x-axis direction, and thus, widths of lower-plate electrodes 191 of the optical modulation device 1 corresponding to the respective reverse phase gradient portions and/or the number of the lower-plate electrodes 191 in one unit may be appropriately controlled.

A curvature of the phase change in the Fresnel lens is modifiable by controlling voltages supplied to the lower-plate electrodes 191 and the upper-plate electrode 290.

Figure 23:
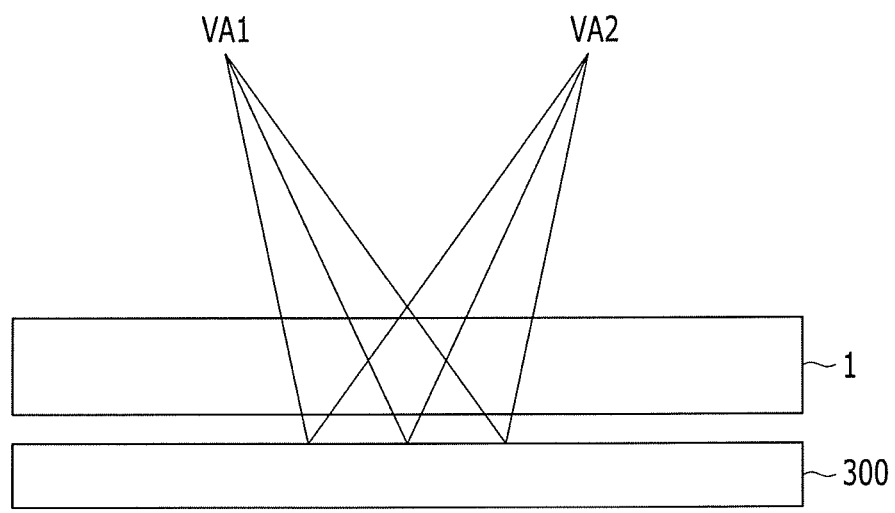
FIG. 23 and FIG. 24 show an optical device using an optical modulation device according to an exemplary embodiment of the present invention, showing a structure of the optical device acting as a stereoscopic image display device and a method for displaying a two-dimensional (2D) image and a three-dimensional (3D) image using the same.
Figure 24:
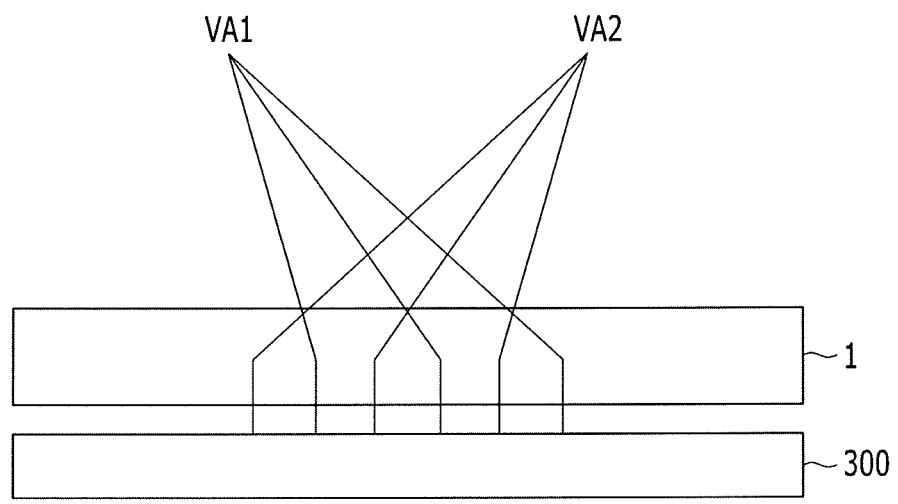

FIG. 23 and FIG. 24 show an optical device using an optical modulation device 1 according to an exemplary embodiment of the present invention, showing a structure of the optical device acting as a stereoscopic image display device and a method for displaying a 2D image and a 3D image using the same.

Referring to FIG. 23 and FIG. 24, the optical device, which may act as a stereoscopic image display device, may include a display panel 300 and an optical modulation device 1 provided on a front side for displaying an image of the display panel 300. The display panel 300 may include a plurality of pixels for displaying images, and the plurality of pixels may be arranged in a matrix form.

Referring to FIG. 23, in a 2D mode, the display panel 300 may display 2D images of each frame displayed by the display panel 300, and referring to FIG. 24, in a 3D mode, the display panel 300 may display images such as right-eye images, left-eye images, or the like, which correspond to various viewpoints by dividing the images using a spatial division scheme. In the 3D mode, some of the plurality of pixels may display an image corresponding to one of the viewpoints, and other pixels may display an image corresponding to another one of the viewpoints. The number of the viewpoints may be at least two.

The optical modulation device 1 may divide the image displayed by the display panel 300, according to e.g., the viewpoints, by repeatedly realizing the Fresnel lens each including a plurality of forward phase gradient portions and a plurality of reverse phase gradient portions.

The optical modulation device 1 may be switched to on or off. For example, when the optical modulation device 1 is switched to on, the stereoscopic image display device may operate in the 3D mode, and as shown in FIG. 24, the optical modulation device 1 may form a plurality of Fresnel lenses that refracts the image displayed by the display panel 300 and displays the image with the corresponding viewpoint. In addition, when the optical modulation device 1 is switched to off, as shown in FIG. 23, the image displayed by the display panel 300 is not refracted, the image passes through the optical modulation device 1, and thus, the 2D image may be observed.

While the present invention has been particularly shown and described with reference to exemplary embodiments thereof, it will be understood that the present invention is not limited to the disclosed embodiments thereof.

What is claimed is:

1. A method for driving an optical modulation device including a first portion and a second portion, wherein each of the first and second portions includes a first plate, a second plate opposite to the first plate, and a liquid crystal layer disposed between the first plate and the second plate, comprising:
    forming a forward phase gradient in the first portion by applying a first driving signal to first and second electrodes in the first plate of the first portion and a third electrode in the second plate of the first portion; and
    forming a reverse phase gradient in the second portion by applying a second driving signal differing from the first driving signal to fourth and fifth electrodes in the first plate of the second portion and a sixth electrode in the second plate of the second portion,
    wherein the first plate includes a first aligner, the second plate includes a second aligner, and an alignment direction of the first aligner and an alignment direction of the second aligner are substantially the same as each other in a plan view, and
    wherein the second driving signal supplies a greater absolute value of voltage to the fourth electrode than to the fifth electrode during a first step, supplies voltages of opposite polarities to the fourth electrode and the fifth electrode to each other during a second step, and supplies a greater absolute value of voltage to the fifth electrode than to the fourth electrode during a third step.

2. The method of claim 1, wherein the first aligner and the second aligner are configured to provide a pre-tilt bias to the liquid crystal layer such that when no electric field is formed in the liquid crystal layer, a tilt direction of liquid crystal molecules of the liquid crystal layer near the first plate is opposite to a tilt direction of liquid crystal molecules of the liquid crystal layer near the second plate.

3. The method of claim 1, wherein when the first driving signal is applied to the first to third electrodes, an absolute value of a first voltage applied to the first electrode is less than an absolute value of a second voltage applied to the second electrode, the first and second electrodes neighboring each other.

4. The method of claim 3, wherein when the first driving signal is applied to the first to third electrodes, polarities of the first voltage and the second voltage with respect to a third voltage applied to the third electrode are the same as each other.

5. The method of claim 4, wherein when the first driving signal is applied to the first to third electrodes, an intensity of an electric field in a region of the liquid crystal layer near the first electrode is less than an intensity of an electric field in a region of the liquid crystal layer near the third electrode corresponding to the first electrode.

6. The method of claim 5, wherein an intensity of an electric field in a region of the liquid crystal layer near the second electrode is greater than an intensity of an electric field in a region of the liquid crystal layer near the third electrode corresponding to the second electrode.

7. The method of claim 1, wherein the forming of the reverse phase gradient in the second portion by applying the second driving signal includes:
    applying a first signal of the second driving signal to the fourth to sixth electrodes;
    applying a second signal of the second driving signal to the fourth to sixth electrodes after a first time elapses since the first signal is applied; and
    applying a third signal of the second driving signal to the fourth to sixth electrodes after a second time elapses since the fourth driving signal is applied.

8. The method of claim 7, wherein when the first signal of the second driving signal is applied to the fourth to sixth electrodes, an absolute value of a fourth voltage applied to the fourth electrode is less than an absolute value of a fifth voltage applied to the fifth electrode, the fourth and fifth electrodes neighboring each other.

9. The method of claim 8, wherein when the first signal of the second driving signal is applied to the fourth to sixth electrodes, polarities of the fourth voltage and the fifth voltage with respect to a sixth voltage applied to the sixth electrode are the same as each other.

10. A method for driving an optical modulation device including first portion and a second portion, wherein each of the first and second portions includes a first plate, a second plate opposite to the first plate, and a liquid crystal layer disposed between the first plate and the second plate, comprising:
    firming a forward phase gradient in the first portion by applying a first driving signal to first and second electrodes in the first plate of the first portion and a third electrode in the second plate of the first portion; and
    forming a reverse phase gradient in the second portion by applying a second driving signal differing from the first driving signal to fourth and fifth electrodes in the first plate of the second portion and a sixth electrode in the second plate of the second portion,
    wherein the first plate includes a first aligner, the second plate includes a second aligner, and an alignment direction of the first aligner and an alignment direction of the second aligner are substantially parallel to each other,
    wherein the forming of the reverse phase gradient in the second portion by applying the second driving signal includes:
    applying a first signal of the second driving signal to the fourth to sixth electrodes;
    applying a second signal of the second driving signal to the fourth to sixth electrodes after a first time elapses since the first signal is applied; and
    applying a third signal of the second driving signal to the fourth to sixth electrodes after a second time elapses since the fourth driving signal is applied,
    wherein when the first signal of the second driving signal is applied to the fourth to sixth electrodes, an absolute value of a fourth voltage applied to the fourth electrode is less than an absolute value of fifth voltage applied to the fifth electrode, the fourth and fifth electrode neighboring each other, wherein when the first signal of the second driving signal is applied to the fourth to sixth electrodes, polarities of the fourth voltage and the fifth voltage with respect to a sixth voltage applied to the sixth electrode are the same as each other, and wherein when the second signal of the second driving signal is applied to the fourth to sixth electrodes, a polarity of a seventh voltage applied to the fourth electrode is opposite to a polarity of an eighth voltage applied to the fifth electrode.

11. The method of claim 10, wherein the polarity of the eighth voltage is the same as the polarity of the fifth voltage.

12. The method of claim 11, wherein the third signal of the second driving signal is applied to the fourth to sixth electrodes, and an absolute value of a ninth voltage applied to the fourth electrode is greater than an absolute value of a tenth voltage applied to the fifth electrode.

13. The method of claim 12, wherein when the third signal of the second driving signal is applied to the fourth to sixth electrodes, polarities of the ninth voltage and the tenth voltage with respect to an eleventh voltage applied to the sixth electrode are the same as each other.

14. The method of claim 13, wherein the polarity of the eighth voltage is the same as the polarity of the tenth voltage.

* * * * *